(12) United States Patent
Matsumoto

(10) Patent No.: US 7,715,487 B2
(45) Date of Patent: May 11, 2010

(54) WIRELESS APPARATUS EMPLOYING MULTI-LEVEL QAM AND METHOD FOR ESTIMATING THRESHOLD VALUE

(75) Inventor: Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1827 days.

(21) Appl. No.: 10/730,136

(22) Filed: Dec. 9, 2003

(65) Prior Publication Data

US 2004/0114692 A1 Jun. 17, 2004

(30) Foreign Application Priority Data

Dec. 12, 2002 (JP) ............................. 2002-360896

(51) Int. Cl.
*H04L 5/12* (2006.01)
*H04L 23/02* (2006.01)
(52) U.S. Cl. ..................... 375/264; 375/261; 375/286; 375/287
(58) Field of Classification Search ................. 375/261, 375/264, 286–287
See application file for complete search history.

(56) References Cited

U.S. PATENT DOCUMENTS

| 5,295,155 | A | * | 3/1994 | Gersbach et al. ............ 375/214 |
| 6,018,526 | A | | 1/2000 | Liu et al. |
| 6,034,620 | A | | 3/2000 | Ikka |

(Continued)

FOREIGN PATENT DOCUMENTS

| JP | 6-1908 | 1/1994 |
| JP | 11-4247 | 1/1998 |

(Continued)

OTHER PUBLICATIONS

3rd Generation Partnership Project: Technical Specification Group Radio Access Network; Physical Channels and mapping of transport channels onto physical channels (FDD) (Release 5), 3GPP TS 25.211 V5.1.0 (Jun. 2002), pp. 26-27 and 40-41.

(Continued)

*Primary Examiner*—Curtis B Odom
(74) *Attorney, Agent, or Firm*—McGinn IP Law Group, PLLC

(57) ABSTRACT

An wireless terminal includes a demodulating unit which comprises an FV (fading vector) estimating unit for receiving a CPICH spread/demodulated signal to output an FV signal with a reduced noise ratio; a phase synchronization unit for multiplying a PDSCH spread/demodulated signal with a complex conjugate of the FV signal to correct the phase offset of the PDSCH I and Q signals to send the resulting PDSCH I and Q signals to a multi-level QAM amplitude synchronization detection unit and to an amplitude demodulating unit; a first-quadrant transformation unit for collecting the second to fourth quadrant signals of the phase-synchronized PDSCH I and Q signals; and a threshold value detecting unit for calculating a multi-level QAM threshold value from the first quadrant signals and the FV signals to send the threshold signal to an amplitude demodulating unit. The amplitude demodulating unit effects amplitude demodulation to output multi-level QAM demodulated signals. The threshold value detecting unit previously assumes a plural number of probabilities as to which of the levels received data belongs to and, using a plural number of the data, raises the precision of the assumed data. The threshold value is estimated, using the frequencies and differences of the respective levels, from the assumed plural threshold values.

49 Claims, 17 Drawing Sheets

U.S. PATENT DOCUMENTS

| | | | |
|---|---|---|---|
| 7,050,761 B2 | 5/2006 | Hamabe | |
| 2001/0010709 A1* | 8/2001 | Iwamatsu et al. | 375/264 |
| 2002/0122504 A1* | 9/2002 | Payne et al. | 375/317 |

FOREIGN PATENT DOCUMENTS

| | | |
|---|---|---|
| JP | 10-145442 | 5/1998 |
| JP | 11-017759 | 1/1999 |
| JP | 2002-217862 | 8/2002 |
| JP | 2002-262349 | 9/2002 |
| JP | 2002-325063 | 11/2002 |
| JP | 2002-335296 | 11/2002 |

OTHER PUBLICATIONS

3rd Generation Partnership Project: Technical Specification Group Radio Access Network;Spreading and modulation (FDD) (Release 5), 3GPP TS 25.213 V5.1.0 (Jun. 2002), pp. 19-23.

3rd Generation Partnership Project: Technical Specification Group Radio Access Network; Physical layer procedures (FDD) (Release 5), 3GPP TS 25.214 V5.1.0 (Jun. 2002), p. 30.

3rd Generation Partnership Project: Technical Specification Group Radio Access Network; Physical Channels and mapping of transport channels onto physical channels (FDD) (Release 5), 3GPP TS 25.211 V5.2.0 (Sep. 2002), pp. 40-41.

3rd Generation Partnership Project: Technical Specification Group Radio Access Network; Spreading and modulation (FDD) (Release 5), 3GPP TS 25.213 V5.2.0 (Sep. 2002), pp. 19-23.

3rd Generation Partnership Project: Technical Specification Group Radio Access Network; Physical layer procedures (FDD) (Release 5), 3GPP TS 25.214 V5.2.0 (Sep. 2002), p. 30.

* cited by examiner

OUTPUT: ABSOLUTE THRESHOLD VALUES FOR I-AXIS
OUTPUT: ABSOLUTE THRESHOLD VALUES FOR Q-AXIS

• D_M = D_std(0)

FIRST DATA D_std(0) IS Low
count_H > count_L

•

Threshold
=2*D_std(0)
········································

•

"0" Level
········································

FIG. 12C

FIRST DATA D_std(0) IS High
count_H < count_L

Threshold
=2/3*D_std(0)
········································
•

"0" Level
········································
•

WIRELESS APPARATUS EMPLOYING MULTI-LEVEL QAM AND METHOD FOR ESTIMATING THRESHOLD VALUE

FIELD OF THE INVENTION

This invention relates to a receiving method and a receiving apparatus suited for a multi-level QAM (quadrature amplitude modulation) system.

BACKGROUND OF THE INVENTION

In a multi-level QAM system, information is included in both phase and amplitude. In the multi-level QAM system, it has been thought customary to transmit a predetermined signal for phase and amplitude synchronization. In HSPDA in 3GPP (Third Generation Partnership Project), a synchronization signal along the phase direction is transmitted over a separate channel. However, no synchronization signal along the amplitude direction is transmitted. Moreover, the transmission power is varied with time in accordance with the operation in a base station. Thus, there arose a necessity for the mobile station to estimate a threshold value to achieve amplitude synchronization, without resorting to a preset signal. The outline of the HSPDA are now explained (see for example the following Patent Publication 1).

The HSDPA, in which a base station transmits high-speed data via a downlink network to a mobile station in a cellular system is now under investigation by 3GPP. In this HSDPA, a high speed physical downlink shared channel (HS-PDSCH) is used for transmission over downlink channel from the base station to the mobile station. This HS-PDSCH is used for data transmission from each base station to a plural number of mobile stations. Thus, the base station or a base station control device decides on a schedule for transmitting data to each of the plural mobile stations and transmits data at timings which differ from one mobile station to another. For controlling the data transmission from the base station to the mobile station, each base station sets a dedicated channel DPCH (dedicated physical channel) independently with each of the mobile stations. This DPCH is used for transmitting control information from the base station to the mobile station by a downlink signal and for transmitting control information from the mobile station to the base station by the signal in the reverse direction, that is, by an uplink signal. The control information transmitted from the base station to the mobile station includes the information on the data transmission timing to the mobile station.

In the HS-PDSCH, there is known a technique in which such a modulation system is selected and used, depending on the state of the propagation channel between the base station and the mobile station, from among plural modulation systems, such as QPSK, 16-ary QAM or 64-ary QAM, which will enable the fastest data transmission, insofar as the target bit error rate is satisfied. The information for selecting the modulation system is also transmitted from the base station to the mobile station as the control information. There are occasions wherein, for changing over the modulation mode, the receiving quality of common pilot signals, transmitted from the base station, is measured, and the measured results are transmitted as the control information from the base station to the mobile station. In the mobile station, the ratio of time spent by the mobile station on receiving data with use of the HS-PDSCH is small. However, the DPCH is persistently allocated between the mobile station and the base station, even in the data awaiting state in which data is not received, so that data transmission can be commenced in a short time when a request is made for data transmission. Thus, although each base station may have data communication with only one mobile station at the same time, a large number of mobile stations are in the data awaiting state, and set DPCH between the base station and the mobile stations.

In the data transmission which employs HS-PDSCH, if the control information transferred by DPCH is low in reliability, the occurrence of reception error in the control information received by the base station and the mobile station is increased, thereby to lower the data transmission efficiency. In the HS-PDSCH, transmission power is set larger than that of a downlink signal of each DPCH, in order to effect high-speed data transmission. Thus, if the data block is re-transmitted due to failure in transmission, the power of an interference wave of the downlink is increased appreciably, thus reducing network capacity.

As for details in the signal format of the HS-PDSCH (sub-frame structure), reference is made to publications listed below (for example, see non-patent publications 1 and 4). As for the constellation chart for 16-level QAM and the spreading of the downlink physical channel, reference is made to publications listed below (for example, see non-patent publications 2 and 5). As for the power control of HS-PDSCH, reference is made to publications listed below (for example, see non-patent publications 3 and 6). As for the structure of phase synchronization for 16-level QAM on the CPICH, reference is made to publications listed below (for example, see non-patent publication 1). The CPICH is transmitted by a specified code (for example, see non-patent publication 2).

Non-Patent Publication 1:
  3GPP TS 25.211 V5.1.0. (2002 June) (3rd Generation Partnership Project; Technical Specification Group Radio Access Network; Physical channels and mapping of transport channels onto physical channels (FDD) (Release 5)) 5.3.3.13 High Speed Physical Downlink Shared Channel (HS-PDSCH), 5.3.3.1, Common Pilot Channel (CPICH) Internet URL <http://www.3gpp.org/ftp/Specs/2002-06/Rel-5/25-series/ File name: 25211-510.zip Non-Patent Publication 2:
  3GPP TS 25.213 V5.1.0. (2002 June) (3rd Generation Partnership Project; Technical Specification Group Radio Access Network; Spreading and modulation (FDD) (Release 5)) 5.1 Spreading, 5.2.2 Scrambling Code Internet URL <http://www.3gpp.org/ftp/Specs/2002-06/Rel-5/25-series/ File Name: 25213-510.zip>

Non-Patent Publication 3:
  3GPP TS 25.214 V5.1.0. (2002 June) (3rd Generation Partnership Project; Technical Specification Group Radio Access Network; Physical layer procedures (FDD) (Release 5)) 5.2.11 HS-PDSCH Internet URL <http://www.3gpp.org/ftp/Specs/2002-06/Rel-5/25-series/ File Name: 25214-510.zip>

Non-Patent Publication 4:
  3GPP TS 25.211 V5.2.0. (2002 September) (3rd Generation Partnership Project; Technical Specification Group Radio Access Network; Physical channels and mapping of transport channels onto physical channels (FDD) (Release 5)) 5.3.3.13 High Speed Physical Downlink Shared Channel (HS-PDSCH), Internet URL <http://www.3gpp.org/ftp/Specs/latest/Rel-5/25-series/ File Name: 25211-520.zip>

Non-Patent Publication 5:
  3GPP TS 25.213 V5.2.0. (2002 September) (3rd Generation Partnership Project; Technical Specification Group Radio Access Network; Spreading and modulation (FDD) (Release 5)) 5.1 Spreading, 5.2.2 Scrambling Code Internet URL <http://www.3gpp.org/ftp/Specs/latest/Rel-5/25-series/ File Name:25213-520.zip>

Non-Patent Publication 6:

3GPP TS 25.214 V5.2.0. (2002 September) (3rd Generation Partnership Project; Technical Specification Group Radio Access Network; Physical layer procedures (FDD) (Release 5)) 5.2.11 HS-PDSCHS Internet URL <http://www.3gpp.org/ftp/Specs/2002-06/Rel-5/25-series/ File Name: 25214-520.zip>

Meanwhile, there is known an n-ary (multi-level) QAM decoding apparatus, as a decoding apparatus for preventing an error in data decision in decoding a wireless communication signal of the orthogonal frequency division multiplexing (OFDM) system employing a demodulation system for a multi-level QAM signal, in which frequency domain signals of the baseband Ich and Qch are Fourier-transformed, variations in the amplitude and the phase of Ich and Qch data signals are estimated, in the estimating unit for Ich and in the estimating unit for Qch, respectively, based on a pilot signal in the transformed signals, and in which the threshold values are corrected in an Ich threshold correction unit and a Qch threshold correction unit, based on the estimated results (for example, see Patent Publication 2).

Moreover, in a fading network where the transmission line is subjected to severe variations, there is known a configuration including a transmission line distortion compensation unit, which is adapted for estimating the threshold value information as needed for deciding data in a decoding unit, as a transmission line compensation system in case of managing an n-ary(multi-level) quadrature amplitude modulation system (for example, see Patent Publication 3).

Patent Publication 1
Japanese Patent Kokai Publication No. JP-P2002-325063A (page 5)

Patent Publication 2
Japanese Patent Kokai Publication No. JP-P2002-217862A (pages 3 and 4, FIG. 2)

Patent Publication 3
Japanese Patent Kokoku Publication No. JP-B-6-1908 (pages 2 to 4, FIG. 4)

SUMMARY OF THE DISCLOSURE

In e.g. 16-level QAM in the aforementioned 3GPP Release-5 specifications, phase synchronization in the Release-5 specifications may be achieved by CPICH. However, the amplitude information is not transmitted from the base station to a terminal (UE). Thus, the terminal side has to estimate the threshold value.

Accordingly, it is an object of the present invention to provide a method, an apparatus and a system in which, even in a case where no definite amplitude information is supplied from a transmission side to a reception side which receives an n-ary(multi-level) QAM signal, the threshold value may be estimated to achieve amplitude synchronization to demodulate the data.

The above and other objects are attained by a method according to one aspect of the present invention, for estimating a threshold value in deciding data along the amplitude direction by a terminal having wireless communication with a wireless station in accordance with the multi-level QAM (quadrature amplitude modulation), said method comprising a first step of the terminal presupposing in which one of multiple levels can be the level of a received data and setting a plural number of threshold values assumed in association with the presupposition, a second step of the terminal sequentially updating the assumed threshold values based on the received data, and a third step of the terminal selecting an ultimate threshold value from the plural assumed threshold values.

A terminal apparatus, in accordance with another aspect of the present invention, which performs wireless communication with a wireless station in accordance with a multi-level QAM (quadrature amplitude modulation), comprises an amplitude synchronization detection unit for estimating a threshold value for deciding data along the amplitude direction, and an amplitude demodulating unit for effecting amplitude demodulation using the threshold value. The amplitude synchronization detection unit includes means for presupposing which level the received data may belong to and for setting a plural number of threshold values that may be assumed in association with the presupposition, means for sequentially updating the assumed threshold values based on the received data, and means for selecting an ultimate threshold value from the plural assumed threshold values.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 12A, 12B and 12C illustrate the second embodiment of the present invention.

PREFERRED EMBODIMENTS OF THE INVENTION

Figure 1:
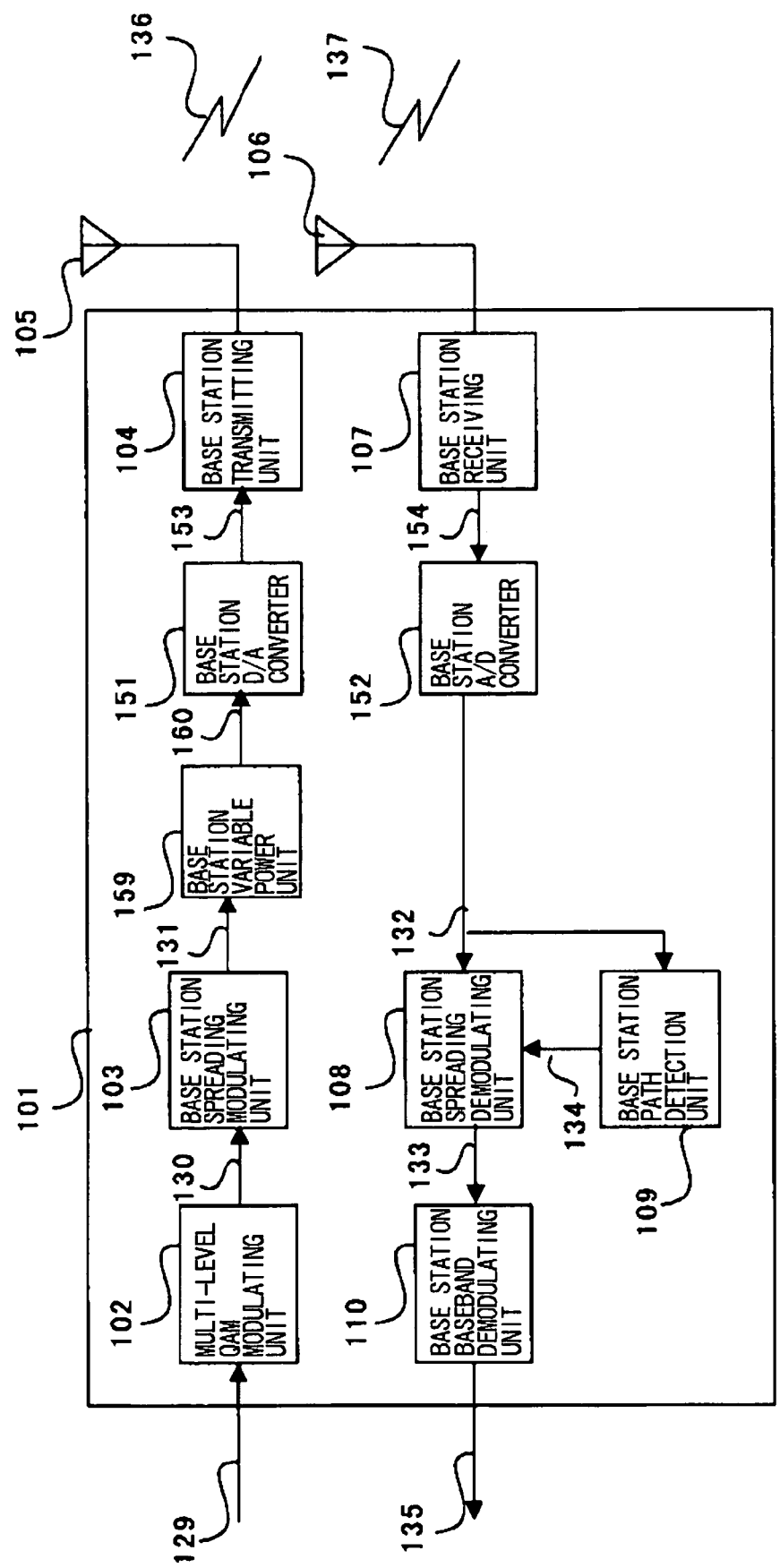
FIG. 1 shows the structure of a wireless base station according to an embodiment of the present invention.

An embodiment of the present invention is hereinafter explained. The method according to the present invention is a method for estimating a threshold value for deciding data along the amplitude direction in a wireless apparatus employing the multi-level QAM system. For example, in case the amplitude information is not definitely imparted as a synchronization signal from the transmitting side to the receiving side, the method estimates a threshold value by the following steps.

Step 1: It is presupposed which one of multiple levels can be the level of a received data signal and a plural number of threshold values are assumed in association with the presupposition (referred to herein as 'assumed threshold values') (for example, 402 of FIG. 5).

Step S2: The assumed threshold values are sequentially updated, based on the received plural data signals(for example, 403 to 408 of FIG. 5).

Step S3: One threshold value is selected from the plural assumed threshold values (413 of FIG. 5).

That is, in an embodiment of the present invention, plural possibilities are presupposed as to which level the received data signal belongs to, using the magnitude of the received data signal, and the accuracy of assumed values is raised, using the plural data signal. One assumed value among the plural assumed values is selected, using the frequency or an error from data, to estimate the threshold value to effect data demodulation. In e.g. threshold value estimation by measurement of the received power is unmeritorious in threshold value estimation in case there is a bias in the received data.

(a) As one of characteristics of the present invention, plural assumed threshold values, are presupposed and made to follow the received data. To this end, any one of the following techniques is used.

(a-1) It is presupposed which one of multiple levels can be the level of the received data and a plural number of assumed possible threshold values are prepared in association with the presupposition.

(a-2) Alternatively, the ratio of plural CPICH channels (common pilot channels), that may be presupposed on the system, may be presupposed.

(b) One assumed threshold value is selected among the results presupposed in the step (a). To this end, any one of the following techniques is used.

(b-1) The threshold value with a larger number of counts (number of occurrences) is selected.

(b-2) Such a threshold value, which has a ratio as to plural calculated threshold values close to a presupposed threshold value ratio(i.e., the difference between the ratios is small), is selected. For example, the selection may be based on the data ratio between low level data and high level data of 3:1.

(b-3) Such threshold value is selected in which the difference of the ultimately calculated mean value of data from the respective received data is selected.

(c) As the manner for the threshold values presupposed in the step (a) to follow the received data, any one of the following techniques is used.

(c-1) For each data signal, the data position is presupposed for the totality (set) of the assumed threshold values, and the totality of the assumed threshold values are re-calculated.

(c-2) In the case of 16-ary QAM, for example, three levels are provided for two assumed threshold values, and detection is made as to where the received data is located. The totality of the assumed threshold values are not updated each time.

(d) When calculating the threshold, it is sufficient that the phase-synchronized multi-level QAM data signals are collected in the first quadrant and calculations are made every in-phase (I) component and every quadrature (Q) component to detect binary-valued thresholds and four-valued thresholds for 16-ary QAM and 64-ary QAM, respectively.

Transforming and collecting the multi-level QAM data in the first quadrant is done by taking absolute values or by rotation.

(e) The calculations may be made as I and Q are assumed to be of the same magnitude.

In consideration that the amplitudes of I and Q may differ due to fading, I and Q may be calculated separately.

(f) For providing the threshold such as to follow the fading, any one of the following techniques may be used.

(f-1) The threshold is supplied by affording a coefficient to the fading vector calculated from the CPICH for following the fading.

(f-2) The threshold itself is calculated and re-calculated every short time period for following the fading.

(g) There are the following two termination conditions for terminating the decision of the threshold value.

(g-1) number of data; and (g-2) the error meets with the conditions as set.

A wireless terminal apparatus, according to the present invention, includes a multi-level QAM demodulating unit 117, having a phase synchronization unit 204, a fading vector estimating unit 203 and a multi-level QAM (quadrature amplitude demodulation) unit 205, and a multi-level QAM amplitude synchronization detection unit 161 having a first-quadrant transformation unit 210 and a threshold value detecting unit 211.

The fading vector estimating unit 203 receives CPICH (common pilot channel) spread/demodulated signal to output a fading vector reduced in the noise ratio.

The phase synchronization unit 204 receives an HS-PDSCH (high speed downlink common channel) spread/demodulated signal and multiplies the HS-PDSCH spread/demodulated signal with a complex conjugate with the fading vector, inclusive of the transmission line information, to supply the HS-PDSCH I and HS-PDSCHQ signals, corrected for phase deviation ascribable to the transmission line, to the multi-level QAM amplitude synchronization detection unit and to the multi-level QAM amplitude demodulating unit 205.

The first-quadrant transformation unit 210 moves the second, third and fourth quadrant signals of the phase-synchronized HS-PDSCH I and HS-PDSCHQ signals, to the first quadrant to form first quadrant signals.

The threshold value detecting unit 211 calculates the multi-level QAM threshold values, from the first quadrant signals and the fading vector, to provide the threshold value signals to the multi-level QAM amplitude demodulating unit 205.

The multi-level QAM amplitude demodulating unit 205 checks the relative magnitudes of the threshold values and the signal amplitudes, from the HS-PDSCHI and HS-PDSCHQ signals and the threshold value signals, to execute amplitude demodulation to output multi-level QAM demodulated signals.

The threshold value detecting unit 211 presupposes which level the received one data signal belongs to. Based on this presupposition, the threshold value detecting unit initializes several other levels and the threshold value, and updates the threshold value by the plural data signal received after the received one data signal, while checking to see which assumption has been correct, based on the frequency of occurrence of the data against the assumed level and on the error between the assumed levels and the received data to decide on the threshold value.

According to the present invention, described above, in case the amplitude information is not given as the synchronization information from the transmitting side to the receiving side, plural possibilities are assumed in advance as to which is the level of received data signal, using the magnitude of the received data signal. These assumed values are improved in accuracy, using plural data, and one of the assumed values is selected, using the frequency (that is, the frequency of data occurrences at the respective levels) or the error from the data, to estimate the threshold value to demodulate the data.

In an embodiment of the present invention, the wireless terminal apparatus at least includes, as a threshold value detection unit, a counter for counting the received data, and first to third counters for counting the data of first to third levels, divided by the first and second threshold values. The threshold value estimating method includes (a) a step in which the threshold value detection unit initializes each of the counters and hold values of the first to third levels (401 of FIG. 5), (b) a step in which the threshold value detection unit calculates, responsive to the value of a first input signal, the first threshold value in case the first input signal is assumed to be of one of high and low levels and the second threshold value in case the first input signal is assumed to be of another level (402 of FIG. 5), (c) a step in which the threshold value detection unit decides, as from a signal next to the first input signal, the relative magnitude of the input data with respect to the first and second threshold values (403 and 405 of FIG. 5), (d) a step in which the threshold value detection unit sums input data to an associated level holding value among the first to third level data, partitioned by the first and second values, based on the decided results, and increments the one of the first to third counters associated with the input data (404, 406 and 407 of FIG. 5), (e) a step in which the threshold value detection unit updates the first and second threshold values, based on the level holding values of the first to third levels (408 of FIG. 5), (f) a step in which the threshold value detection unit performs control for carrying out the decision and averaging after the step (c) if the value of the counter counting the data is smaller than a preset first value (409 of FIG. 5), (g) a step in which the threshold value detection unit performs control so that, if the value of the counter counting the data is not less than the first value, the count value of the counter counting the data is compared to a second value (411 of FIG. 5), so that, if the value of the counter counting the data is less than the second value, an error value between the level holding values of the first to third levels divided by the first and second threshold values and the input data is compared to a preset third value and so that, if the error value is not smaller than the preset third value, the decision and averaging processing as from a signal next to the step (c) is carried out (412 of FIG. 5), and (h) a step in which the threshold value detection unit performs control so that, if the error value is smaller than the third value, or the value of the counter counting the data is larger than the second value, the count value of the counter which counts the data is compared to the count value of the first and the third counter, to output the threshold value with the larger count value (413 of FIG. 5).

The threshold value detection unit outputs a threshold coefficient and an absolute threshold value, while the amplitude demodulating unit demodulates the amplitude using a threshold value output from the threshold value detection unit.

Figure 6:
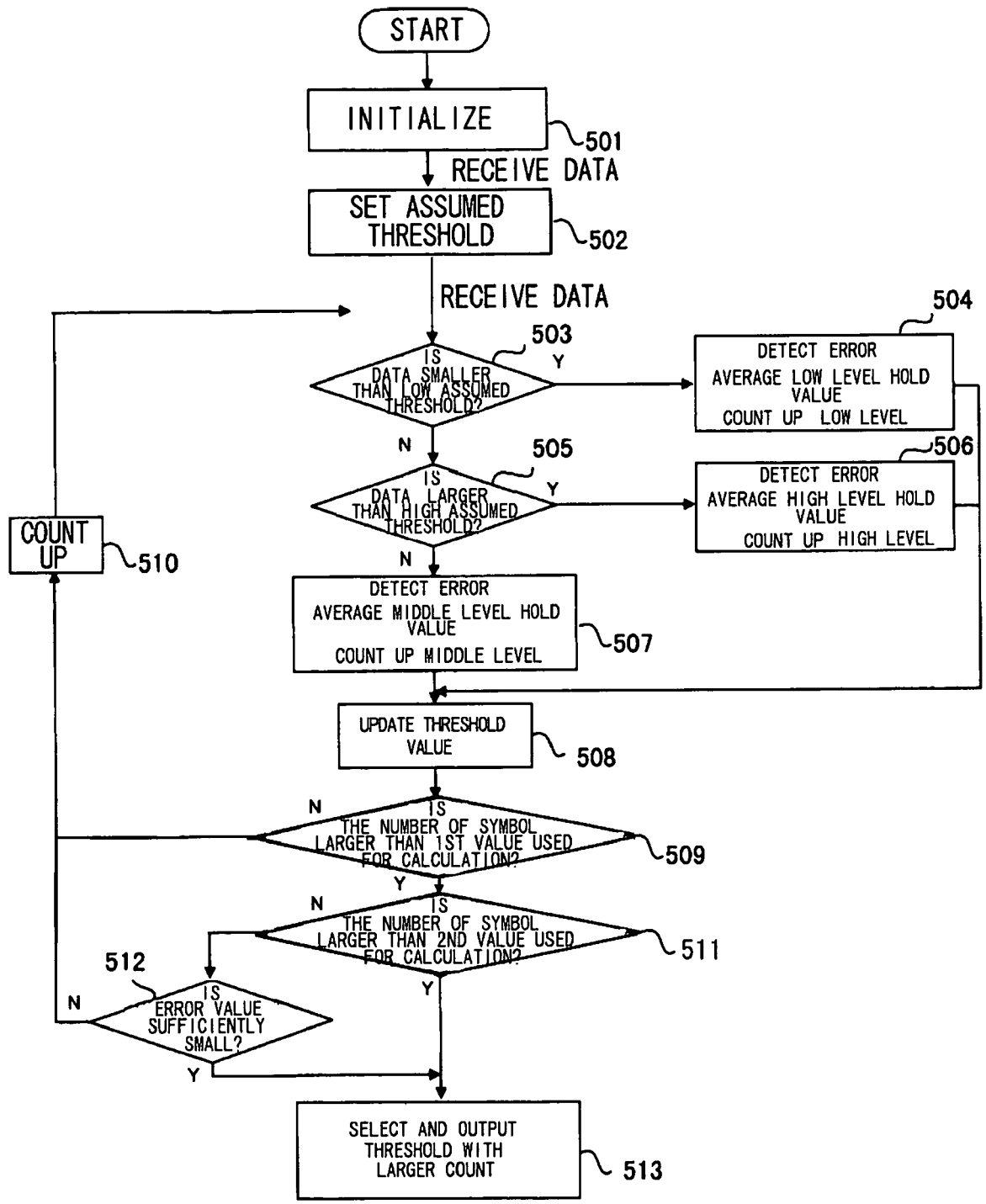
FIG. 6 is a flow diagram for illustrating the operation of a threshold value detection unit 211 according to a second embodiment of the present invention.

In an embodiment of the present invention, the I and Q threshold values may be estimated, using the in-phase data and the quadrature data, respectively (513 of FIG. 6).

In another embodiment of the present invention, the wireless terminal apparatus includes a threshold value detection unit at least including a counter for counting the received data, and first to third counters for counting the data of the first to third levels divided by the first and second threshold values. The threshold estimating method comprises (a) a step in which the threshold value detection unit initializes each counter and hold values of the first and third levels (501 of FIG. 7), (b) a step in which threshold value detection unit calculates, responsive to the value of a first input signal, the first threshold value in case the first input signal is assumed to be of a certain one of high and low levels and the second threshold value in case the first input signal is assumed to be of another level (502 of FIG. 7), (c) a step in which the threshold value detection unit decides, after the first input signal, the relative magnitude of the input data with respect to the first and second threshold values (503 and 505 of FIG. 7), (d) a step in which the threshold value detection unit sums input data to a corresponding level holding value of the first to third level data, divided by the first and second values, based on the decided results, for averaging the level holding values, and increments the one of the first to third counters associated with the input data (504, 506 and 507 of FIG. 7), (e) a step in which the threshold value detection unit updates the first and second threshold values, based on the level holding values of the first to third levels (508 of FIG. 7), (f) a step in which the threshold value detection unit performs control for carrying out the decision and averaging processing as from a signal next to the step (c) if the value of the counter counting the data is smaller than a preset first value (509 of FIG. 7), (g) a step in which the threshold value detection unit performs control so that, if the value of the counter counting the data is not less than the first value, the count value of the counter counting the data is compared to a second value (511 of FIG. 7), in which, if the value of the counter counting the data is less than the second value, an error value between the level holding values of the first to third levels divided by the first and second threshold values and the input data is compared to a preset third value, and in which, if the error value is not smaller than the preset third value, the decision and averaging processing as from a signal next to the step (c) is carried out (512 of FIG. 7), and (h) a step in which the threshold value detection unit performs control for outputting the threshold value with the ratio of the high level to the low level of the level holding value of each level closer to a preset ratio if the error value is smaller than the third value or the value of the counter counting the data is larger than the second value (515 of FIG. 7).

The step (h) includes a step of deciding whether or not the value of the ratio between the level holding value of the first level and the level holding value of the second level and the value of the ratio between the level holding value of the third level and the level holding value of the second level satisfy respective preset values. In case of the ratio values not satisfying the respective preset values, the step calculates the level holding value of the second level by averaging from the level holding value of the first or third level and from the level holding value of the second level, and updating the threshold value (516, 517, 518 and 519 of FIG. 8). The step (h) also includes a step of selecting the threshold value with the larger count value (520, 523 and 524 of FIG. 8), and a step of using the last calculated value incase of absence of a proper ratio (521 and 522 of FIG. 8).

In a further modification of the present invention, the wireless terminal apparatus comprises a threshold value detection unit at least including a counter for counting the received data. The threshold estimating method comprises (a) a step in which the threshold value detection unit initializes the counter (601 of FIG. 9), and (b) a step in which the threshold value detection unit calculates and sets each of first to m-th (where m is an integer greater or equal to 1) threshold values, in case the first input value is presumed to be of the (m+1)-th level, from the first to the m-th level, in case the first input signal is presumed to be of the first level, m being a preset integer not less than 1 (602 of FIG. 9, with m=2 in FIG. 9). The method also includes, for each of the cases where the first input signal is assumed to be from the first level to the (m+1)-th level, (c) a step in which the threshold value detecting unit deciding, as from the initial signal, the relative magnitude of the input data with respect to the first to m-th threshold values of the input data (603, 604, 607 of FIG. 9), (d) a step in which the threshold value detecting unit updates, based on the decided results, an associated level holding value of the first to the (m+1)-th level data, divided by the first to m-th threshold values, using the input data (605, 607, 608 and 609 of FIG. 9), (e) a step in which the threshold value detecting unit updates the values of the first to m-th threshold values, based on data of the first to (m+1)-th levels (610 of FIG. 9), (f) a step in which the threshold value detecting unit performs control so that, in case the value of the counter counting the data is smaller than a preset value, the processing of decision and updating will be carried out as from a signal next to the step (c) (611 of FIG. 9), and (g) a step in which the threshold value detecting unit performs control so that, in case the value of the counter counting the data is not smaller than a preset value, the error between a ratio of level holding values and a preset ratio is calculated for each of level holding values of each of the first to (m+1)-th levels, and each threshold value corresponding to a smaller error value is output (613 to 618 of FIG. 9).

When the threshold value detecting unit updates an associated level holding values of the first to (m+1)-th level data, divided by the first to m-th threshold values, in the step (d), using the input data, a difference between the original level holding value and the input data multiplied by a preset coefficient is summed to the original level holding value.

In a further modification of the present invention, the aforementioned terminal includes a threshold value detection unit at least having a counter counting received data. The threshold estimating method comprises (a) a step in which the threshold value detection unit initializes the counter (701 of FIG. 10), and (b) a step in which the threshold value detection unit calculates, responsive to a value of the first input signal, each of the first to the m-th (where m is an integer greater or equal to 1) threshold values in case the first input signal is assumed to be of the (m+1)-th level, m being a preset integer not less than 1, from the first to m-th threshold values, in case the first input signal is assumed to be of the first level, and sets the so calculated threshold values (702 of FIG. 10, with m=2 in FIG. 10). The threshold estimating method comprises, for each of the cases where the first input signal is assumed to be of the first to (m+1)-th level, (c) a step in which the threshold value detection unit decides, as from a signal next to the first signal, the relative magnitudes of the input data with respect to the first to m-th threshold values (704 and 707 of FIG. 10), (d) a step in which the threshold value detection unit averages, based on the decided results, an associated level holding value of the first to (m+1)-th level data, divided by the first to m-th threshold values, using the input data, and stores the input data in a storage unit (705, 706, 708 and 709 of FIG. 10), (e) a step in which the threshold value detection unit updates the threshold value, based on the hold values of the first to (m+1)-th levels (710 of FIG. 10), (f) a step in which the threshold value detection unit performs control for carrying out the processing of decision and updating as from a signal next to the step (c) in case the value of the counter counting the data is smaller than a preset value, (711 of FIG. 10), (g) a step in which the threshold value detection unit calculates, in case the value of the counter counting said data is not less than said preset value, a total sum of the sum of errors of the data stored in said storage unit and the level holding values for the respective cases where said first input signal is assumed to be of the first level to the (m+1)-th levels (referred to as 'first to (m+1)-th errors'); (713, 714, 716 and 717 of FIG. 10), and (h) a step of comparing the relative magnitudes of the first to (m+1)-th errors and selecting and outputting the threshold value with a smaller error (719 of FIG. 10).

Figure 10:
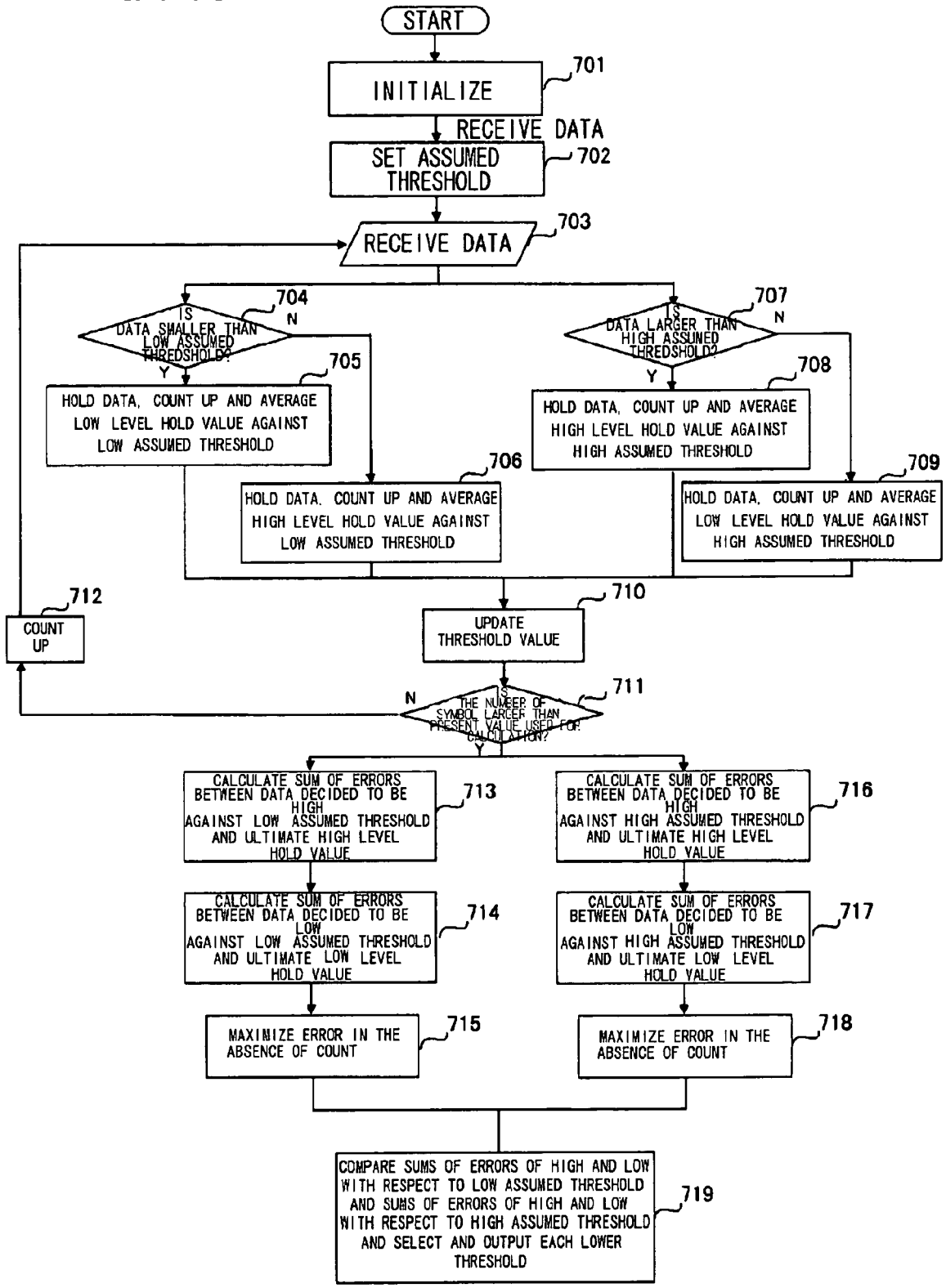
FIG. 10 is a flow diagram for illustrating another typical processing operation of the threshold value detection unit 211 according to a fifth embodiment of the present invention.

In deciding the relative magnitudes with respect to the first or second threshold value, the corresponding error may be set to a predetermined value (715 and 718 of FIG. 10).

In a further modification, the wireless terminal apparatus includes a threshold value detection unit having a data counter for counting data, and first to (m+1)-th counters for counting the number of data occurrences divided by first to m-th counters, where m is a preset positive integer not less than 2. The threshold estimating method includes (a) a step in which the threshold value detection unit initializes each counter and data variables divided by plural threshold values (801 of FIG. 14), and (b) a step in which the threshold value detection unit calculates and sets, responsive to the first input signal, each of first to m-th (where m is an integer greater or equal to 1) threshold values, in case the first input value is presumed to be of the (m+1)-th level, from the first to m-th threshold values, in case the first input signal is presume d to be of the first level. The method also includes, for each of the cases where the first input signal is assumed to be from the first level to the (m+1)-th level (802 of FIG. 14), (c) a step of deciding, as from a signal next to the first signal, the relative magnitudes of the input data with respect to the first to the m-th threshold value (807, 809 and 811 of FIG. 14), (d) a step of summing the input data to an associated level holding value of the first to (m+1)-th data, divided by the first to the m-th threshold value, based on the decided results, by way of averaging, and calculating an error and incrementing the values of an associated one of the first to (m+1)-th counters (808, 810, 812 and 813 of FIG. 14), (e) a step in which the threshold value detection unit re-calculates the values of the threshold values, based on the data of the first level to the (m+1)-th level (814 of FIG. 14), (f) a step of further carrying out a sequence of decision and averaging operations in case the error value is larger than a predetermined first value (815 of FIG. 14), (g) a step of calculating, in case the error value is smaller than the first value, the sum or an average value of the latest errors of the input data with respect to the assumed errors of the first to (m+1)-th levels (817 of FIG. 14), the above steps being executed in the steps 803, 804, 805 and 806 of FIG. 14, and (h) a step in which the threshold value detection unit decides the minimum among the error values as the result of respective assumptions, to decide which assumption has been correct, to output the value of the respective threshold values (818 and 819 of FIG. 14).

It should be noted that, in case the error value is larger than the preset value, in the step (f), a further sequence of decision and averaging operations may be carried out. In case the error value is not larger than the preset value, in the step (g), the sum or a mean value of the latest error values of the input data with respect to the first to (m+1)-th assumed data may also be calculated.

EMBODIMENTS

Referring to the drawings, certain preferred embodiments of the present invention will be explained in detail. FIG. 1 shows a schematic structure of a CDMA (code division multiple access) wireless base station 101 according to an embodiment of the present invention. Referring to FIG. 1, the CDMA wireless base station 101 according to the present embodiment includes a multi-level QAM modulating unit 102, a base station spreading/modulating unit 103, a base station variable power unit 159, a base station D/A (digital/analog) converter 151, a base station transmitting unit 104, a base station transmitting antenna 105, a base station receiving antenna 106, a base station receiving unit 107, a base station A/D (analog/digital) converter 152, a base station spreading demodulation unit 108, a base station path detection unit 109, and a base station baseband demodulating unit 110.

Figure 2:
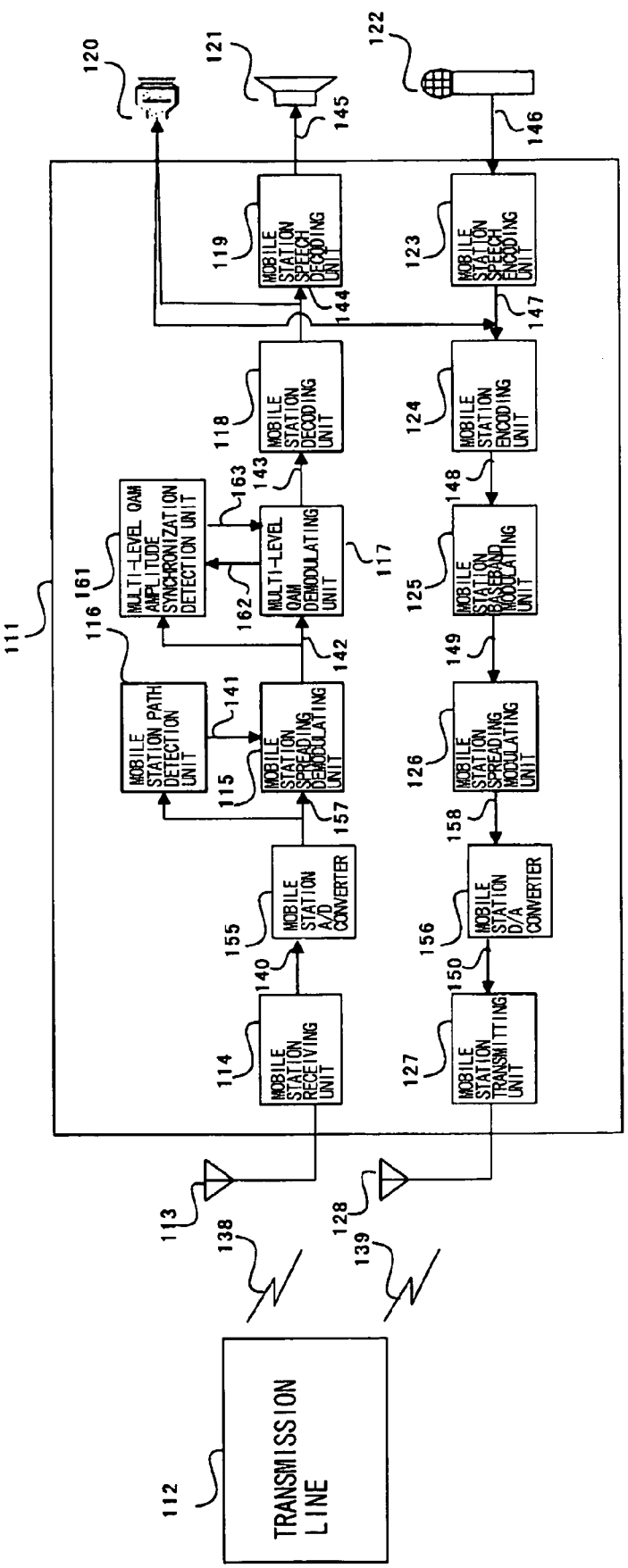
FIG. 2 shows the structure of a wireless mobile station according to an embodiment of the present invention.

FIG. 2 shows a schematic structure of a CDMA wireless mobile station 111 according to an embodiment of the present invention. The CDMA wireless mobile station 111 includes a mobile station receiving antenna 113, a mobile station receiving unit 114, a mobile station A/D converter 155, a mobile station spreading/demodulating unit 115, a mobile station path detection unit 116, an n-ary(multi-level) QAM demodulating unit 117, a multi-level QAM amplitude synchronization detection unit 161, a mobile station decoding unit 118, a mobile station speech decoding unit 119, a mobile station speech encoding unit 123, a loudspeaker 121, a microphone 122 or a data input/output unit 120, an encoded speech signal 147, a mobile station encoding unit 124, a mobile station base-band modulating unit 125, a mobile station spreading/modulation unit 126, a mobile station D/A converter 156, a mobile station transmitting unit 127, and a mobile station transmitting antenna 128.

Figure 3:
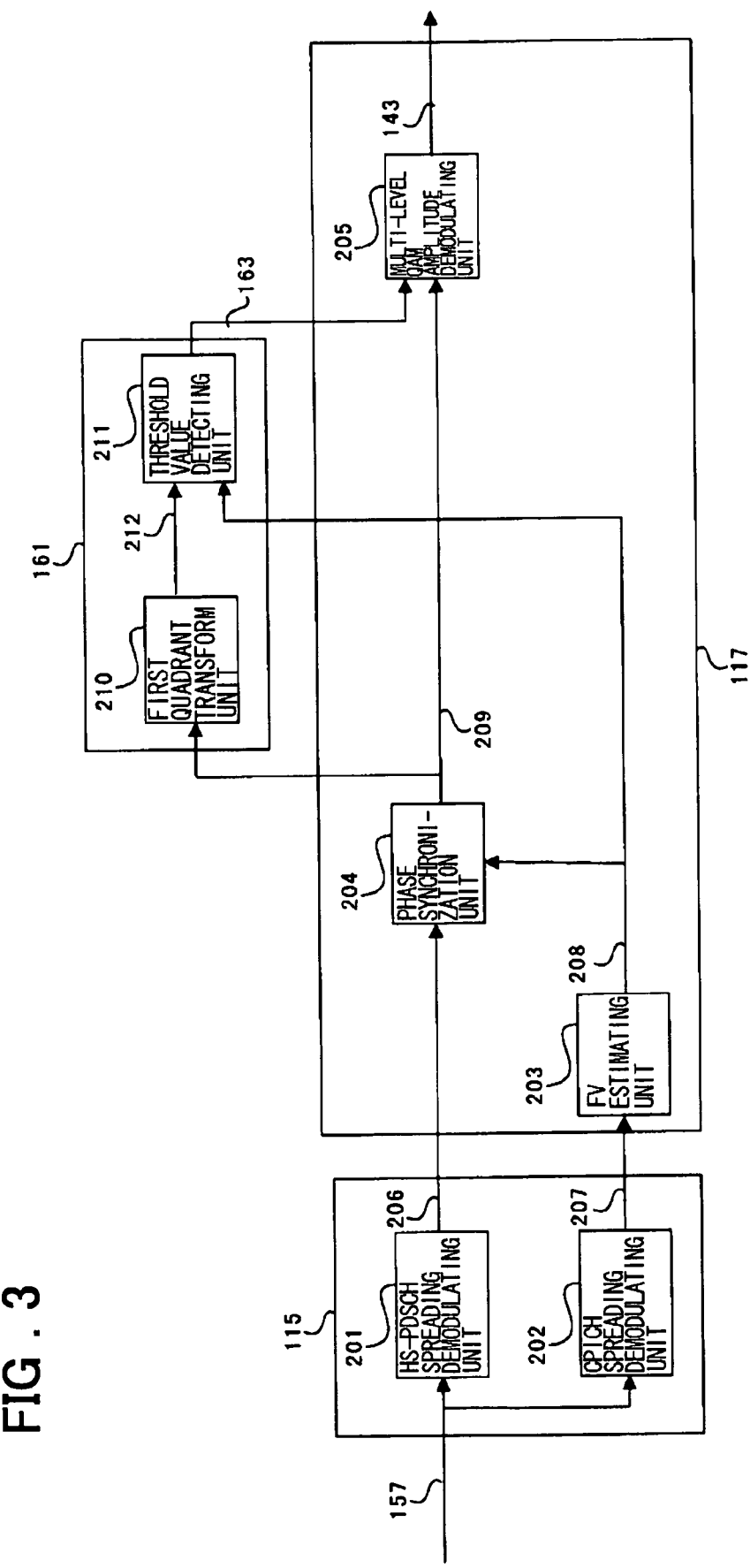
FIG. 3 shows the structure of a mobile station spreading demodulating unit, a multi-level QAM demodulating unit, and a multi-level QAM amplitude synchronization detection unit.

The mobile station demodulating unit 117 includes a phase synchronization unit 204 (see FIG. 3) and an amplitude demodulating unit 205 (see FIG. 3).

Referring to FIGS. 1 and 2, the operation of the present embodiment is explained. In the CDMA wireless base station 101, a downlink signal 129, obtained over a network, is modulated with QAM, such as with 16-ary QAM, in the multi-level QAM modulating unit 102. The resulting output, that is, a signal modulated with an n-ary(multi-level) QAM 130, is spread-modulated in the base station spreading/modulating unit 103. The resulting digital output, that is, a spread-modulated digital signal 131, is varied in power by the base station variable power unit 159 to give a signal 160, which signal 160 is converted in the base station D/A converter 151 into an analog signal 153. This analog signal is converted by the base station transmitting unit 104 to a downlink carrier frequency. The resulting signal is transmitted over the base station transmitting antenna 105 as an electric wave 136.

The electric wave, transmitted over a transmission line 112, is affected as by fading, occurring in the transmission path, so as to be turned into a downlink electric wave 138.

In the CDMA wireless mobile station 111, the downlink electric wave 136 is received by the mobile station receiving antenna 113. The so received signal is converted in frequency by the mobile station receiving unit 114 from the downlink carrier frequency to the baseband. The resulting analog signal 140 is converted by a mobile station A/D converter 155 into a digital signal 157 which is despread by the mobile station spreading/demodulating unit 115. The mobile station path detection unit 116 then detects the downlink path timing from the signal 157 to advise the mobile station spreading/demodulating unit 115 of the downlink path timing by a downlink path timing signal 141. The resulting despread signal 142 is supplied to the multi-level QAM amplitude synchronization detection unit 161 and to the multi-level QAM demodulating unit 117.

The multi-level QAM amplitude synchronization detection unit 161 estimates a threshold value and sends the threshold value information 162 to the multi-level QAM demodulating unit 117.

A multi-level QAM demodulated signal 143, obtained by the multi-level QAM demodulating unit 117, is decoded by the mobile station speech decoding unit 119 by e.g. viterbi decoding, to produce a decoded signal 144. This decoded signal is then decoded into speech by the mobile station speech decoding unit 119 to produce a signal decoded into speech 145, which is then output as speech over loudspeaker 121. Or, the decoded signal 144 is output from the data input/output unit 120 for use for data communication, such as with a personal computer.

A speech signal 146, supplied to the microphone 122, is coded into speech by the mobile station speech encoding unit 123 to produce an encoded speech signal 147, which is further encoded by the mobile station encoding unit 124 to produce an encoded signal 148. This encoded signal 148 is modulated by the mobile station baseband modulating unit 125 by e.g. QPSK to produce a signal 149 which is then spread/modulated by the mobile station spreading/modulation unit 126 to produce a spread/modulated digital signal 158. This spread/modulated digital signal is converted by the mobile station D/A converter 156 into an analog signal 150, which is frequency-converted by the mobile station transmitting unit 127 into an uplink carrier frequency and transmitted over mobile station transmitting antenna 128 as an uplink transmission electric wave 139.

The uplink transmission electric wave 139 is affected by fading, as it is transmitted over the transmission line 112, and is turned into an uplink electric wave 137.

Referring to FIG. 1, the base station receiving antenna 106 in the CDMA wireless base station 101 receives multi-path uplink electric waves. The base station receiving unit 107 executes frequency conversion from the uplink carrier frequency to the baseband to produce an analog signal 154. This analog signal is converted by the base station A/D converter 152 into a digital signal 132. This digital signal 132 is despread by the base station spreading demodulation unit 108. At this time, the base station path detection unit 109 detects the cell timing from the signal 132 and informs the base station path detection unit 109 of the uplink cell information and an uplink cell timing signal 160. The base station path detection unit 109 advises the base station spreading demodulation unit 108 of an uplink path timing signal 134.

A signal 135, which the base station baseband demodulating unit 110 demodulates from a signal after despreading 133, is transmitted to the network.

FIG. 3 shows the structure of an embodiment of the present invention. Specifically, there is shown in FIG. 3 a detailed structure of the mobile station spreading/demodulating unit 115, multi-level QAM demodulating unit 117 and the multi-level QAM amplitude synchronization detection unit 161. FIGS. 4A-4D schematically illustrate the operation of the embodiment of the present invention, and specifically shows the operation of the multi-level QAM amplitude synchronization detection unit 161.

Referring to FIG. 3, the multi-level QAM demodulating unit 117 includes a phase synchronization unit 204, an FV (fading vector) estimating unit 203 and a multi-level QAM amplitude demodulating unit 205. The multi-level QAM amplitude synchronization detection unit 161 includes a first-quadrant transformation unit 210 and a threshold value detecting unit 211.

The mobile station spreading/demodulating unit 115 includes an HS-PDSCH (high speed-physical downlink shared channel) spreading demodulating unit 201 and a CPICH (common pilot channel) spreading demodulating unit 202.

The HS-PDSCH spreading demodulating unit 201 spreading-demodulates the A/D converted signal 157 with a preset code for HS-PDSCH, and sends an HS-PDSCH spread/demodulated signal 206 to the phase synchronization unit 204.

The CPICH spreading demodulating unit 202 spreading-demodulates an A/D converted signal 157, using a preset code for CPICH, to send the resulting HS-PDSCH spread/demodulated signal 207 to the FV estimating unit 203.

The FV estimating unit 203 multiplies the CPICH spread/demodulated signal with a complex conjugate of a predetermined CPICH signal pattern and averages out the CPICH spread/demodulated signal for a preset time range to output a signal FV (fading vector) 208 reduced in the noise ratio.

The phase synchronization unit 204 multiplies the HS-PDSCH spread/demodulated signal, having the effect by the transmission line (indicated in FIG. 4A), with the complex conjugate of the fading vector FV, inclusive of the transmission line information (see FIG. 4B), to send the HS-PDSCH I and Q signals 209, corrected for phase offset caused by being influenced by the transmission line (see FIG. 4C), to the multi-level QAM amplitude synchronization detection unit 161 and to the amplitude demodulating unit 205.

Figure 4D:
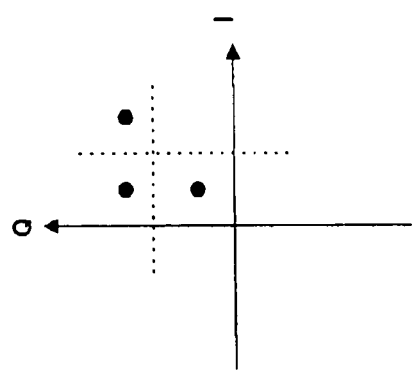
FIGS. 4A, 4B, 4C, 4D and 4D illustrate an embodiment of the present invention.
Figure 4C:
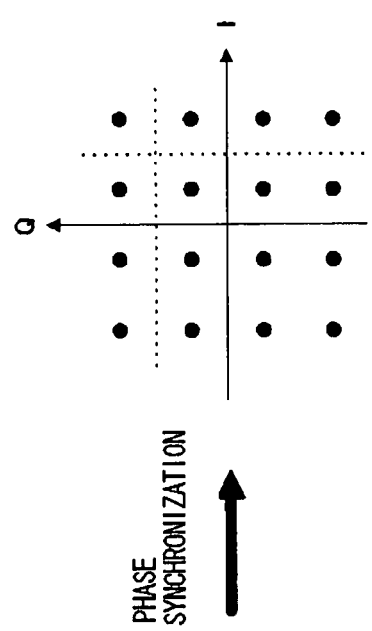
Figure 4A:
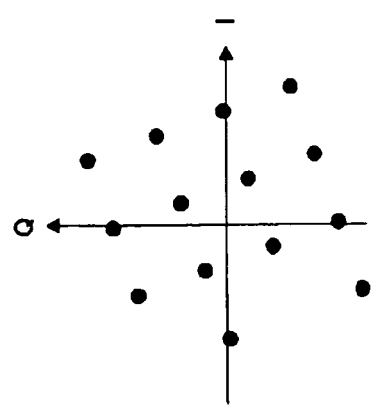
Figure 4B:
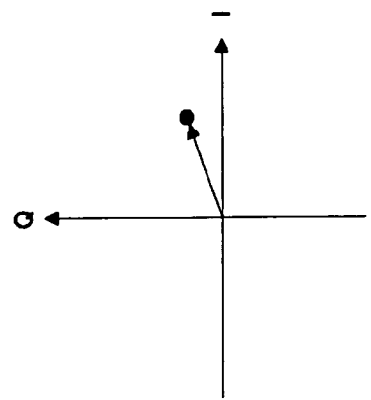

After the phase synchronization, the first-quadrant transformation unit 210 of the multi-level QAM amplitude synchronization detection unit 161 moves second, third and fourth quadrant signals of the HS-PDSCH I and Q signals, in the first quadrant, to yield a first quadrant signal 212 (FIG. 4D). The method for this shifting is by rotation or by using the absolute values. In case of rotation, the equations (4) and (5) are used. In this case, the I and Q components of the signals prior to rotation or translation are indicated by symbols I and Q, respectively, and the I and Q components following the rotated to the first quadrant are indicated by symbols I$^7$ and Q', respectively.

The calculations for rotation through an angle θ:

$$\theta = 90° \quad (1)$$

$$\begin{pmatrix} I^7 \\ Q' \end{pmatrix} = \begin{pmatrix} I \\ Q \end{pmatrix} \begin{pmatrix} 0 & -1 \\ 1 & 0 \end{pmatrix} = \begin{pmatrix} -Q \\ I \end{pmatrix}$$

$$\theta = -90° \quad (2)$$

$$\begin{pmatrix} I^7 \\ Q' \end{pmatrix} = \begin{pmatrix} I \\ Q \end{pmatrix} \begin{pmatrix} 0 & 1 \\ -1 & 0 \end{pmatrix} = \begin{pmatrix} -Q \\ I \end{pmatrix}$$

$$\theta = 180° \quad (3)$$

$$\begin{pmatrix} I^7 \\ Q' \end{pmatrix} = \begin{pmatrix} I \\ Q \end{pmatrix} \begin{pmatrix} -1 & 0 \\ 0 & -1 \end{pmatrix} = \begin{pmatrix} -I \\ -Q \end{pmatrix}$$

Thus, for signals in the second to fourth quadrants:

$$I\_PDSCH(t) * Q\_PDSCH(t) < 0$$

$$\begin{pmatrix} I^7 \\ Q' \end{pmatrix} = \begin{pmatrix} |Q| \\ |I| \end{pmatrix} \quad (4)$$

For signals in the second to fourth quadrants:

$$I\_PDSCH(t) * Q\_PDSCH(t) \leqq 0$$

$$\begin{pmatrix} I^7 \\ Q' \end{pmatrix} = \begin{pmatrix} |I| \\ |Q| \end{pmatrix} \quad (5)$$

For absolute values, the equation (6) is used for all of the quadrants:

$$\begin{pmatrix} I^7 \\ Q' \end{pmatrix} = \begin{pmatrix} |I| \\ |Q| \end{pmatrix} \quad (6)$$

The threshold value detecting unit 211 calculates a threshold value for the multi-level QAM from the first quadrant signal 212 and from FV 208, to send a threshold value signal 163 to the multi-level QAM amplitude demodulating unit 205.

Figure 11C:
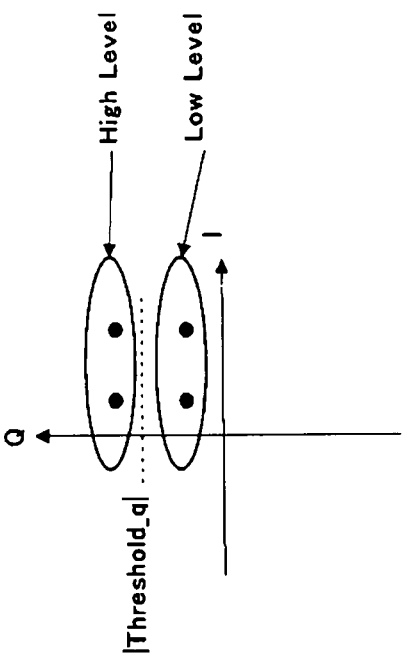
FIGS. 11A, 11B and 11C illustrate a second embodiment of the present invention.
Figure 11B:
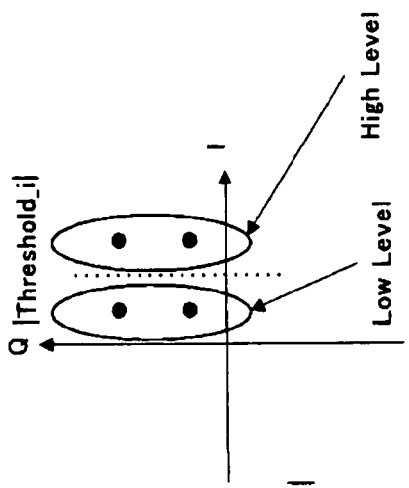
Figure 11A:
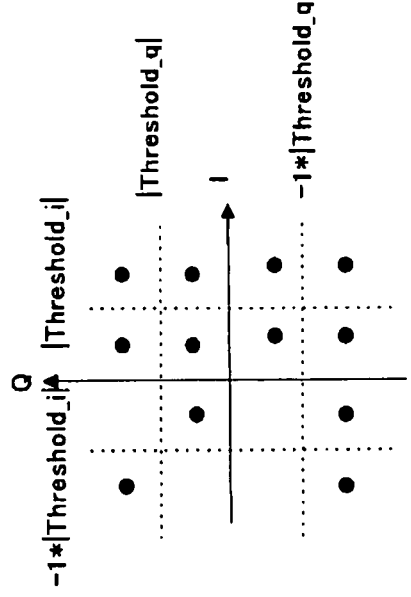

From the HS-PDSCHI and HS-PDSCHQ signals and from the threshold value signal 163, the multi-level QAM amplitude demodulating unit 205 performs decision on the relative signal amplitudes, against threshold values (Threshold_i, Threshold_q in the drawing), as shown in FIG. 11A, to execute amplitude demodulation to output a multi-level QAM demodulated signal 143. FIG. 11A shows an example of a signal space diagram (constellation) of 16-ary QAM and FIGS. 11B and 11C show signal points which are collected into a first quadrant and divided into High and Low levels by absolute values of in phase and quadrature thresholds Threshold_i and Threshold_q respectively.

Figure 5:
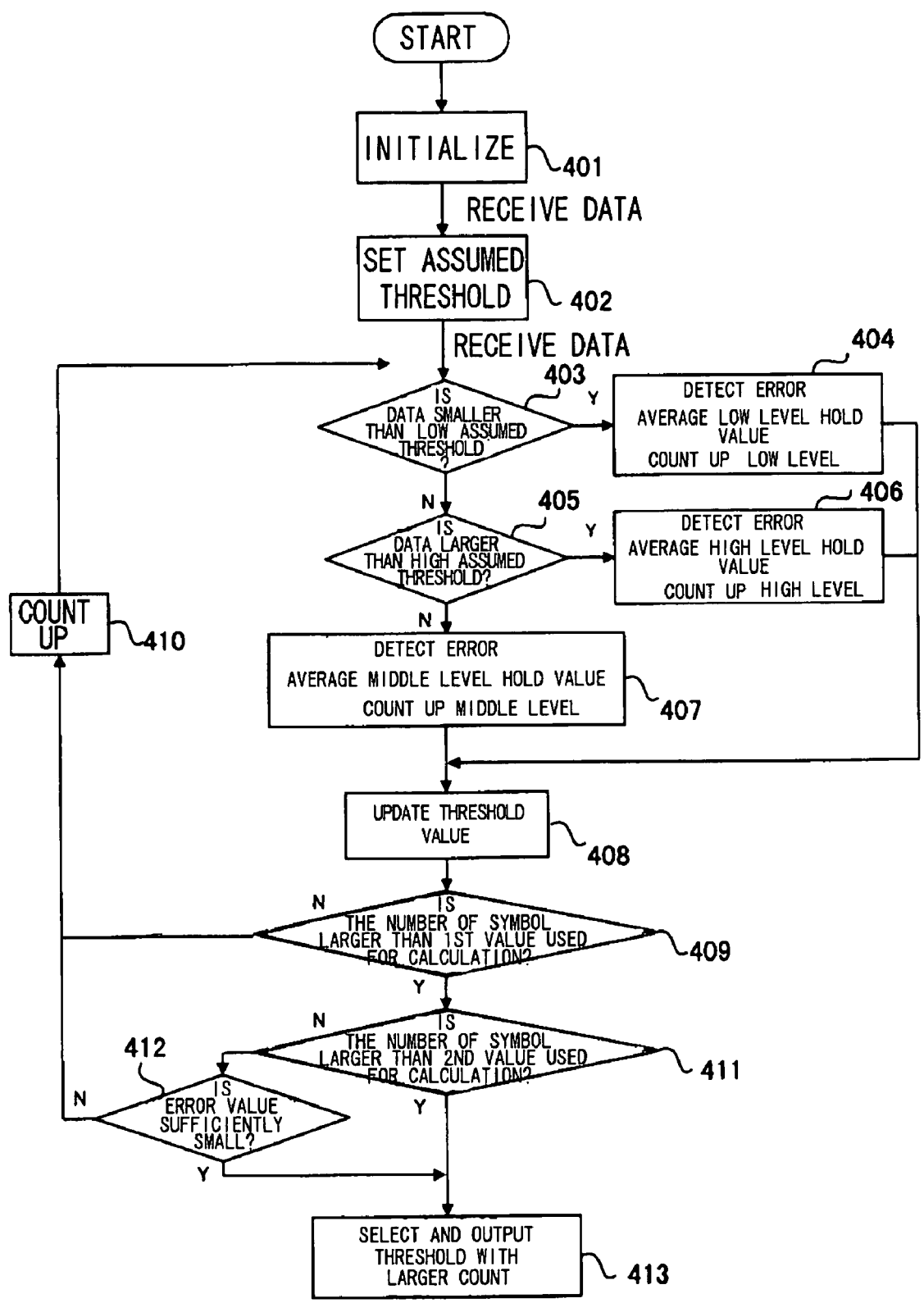
FIG. 5 is a flow diagram for illustrating the operation of a threshold value detection unit 211 according to an embodiment of the present invention.

FIG. 5 depicts a flowchart for illustrating the operation of an embodiment of the present invention, and shows the operation of the threshold value detecting unit 211. The operation of an embodiment of the present invention is now explained.

FIGS. 12A-12C depict schematic views for illustrating the relationship between assumed threshold values Th_H and Th_L and virtual data levels D_H, D_M and D_L.

In FIG. 5, n of D_std(n) denotes a data number which counts up as from a signal next to the time of start of the threshold value detecting operation. The equation used in calculating D_std(n) is now shown.

I_FV(t) and Q_FV(t) denote the I and Q components of FV (208 of FIG. 3) at time t, respectively.

I_HS-PDSCH(t) and Q_HS-PDSCH(t) denote I and Q components of a first quadrant signal (212 of FIG. 3) at time t, respectively.

D_std(n) may be found as follows, by normalizing HS-PDSCH with the square of amplitude values of FV (=I_FV(t)^2+Q_FV(t)^2):

$$I\_HS\text{-}PDSCH\_std(t) = I\_HS\text{-}PDSCH(t)/(I\_FV(t)^2 + Q\_FV(t)^2) \quad (7)$$

$$Q\_HS\text{-}PDSCH\_std(t) = Q\_HS\text{-}PDSCH(t)/(I\_FV(t)^2 + Q\_FV(t)^2) \quad (8)$$

$$D\_std(n) = (I\_HS\text{-}PDSCH\_std(t), Q\_HS\text{-}PDSCH\_std(t)) \quad (9).$$

FIG. 5 shows the processing sequence for a follow-up type embodiment of the present invention. In the follow-up type, a threshold coefficient Th_std is found and the FV signal is multiplied with the Th_std in accordance with the following equation 10 or the equations 11 and 12. The resulting product is used as a threshold value signal 163.

$$|Threshold\_i| = |Threshold\_q| = Th\_std^*(I\_FV(t)^2 + Q\_FV(t)^2) \quad (10)$$

or an absolute value of the threshold in the I axis:

$$|Threshold\_i| = Th\_std^*(I\_FV(t)^2) \quad (11)$$

and an absolute value of the threshold in the Q axis:

$$|Threshold\_q| = Th\_std^*(Q\_FV(t)^2) \quad (12).$$

These equations may be found as follows:

Let the amplitude of the CPICH signal on the transmitting side at time t be |CPICH_tx(t)|, and let the amplitude of the HS-PDSCH signal be |HS-PDSCH_tx(t)|. Also, let the transmission power ratio of CPICH/DSCH be R^2 (square of R) and let the effect of fading in the transmission line on the amplitude be |fv(t)|.

Since each FV signal is a signal obtained by averaging CPICH signals, the amplitude may be assumed to be unchanged in size. Also, let the amplitude of the spreading demodulated HS-PDSCH signal (206) be |HS-PDSCH_rx(t)|, let the amplitude of the phase synchronized HS-PDSCH signal (208) be |CPICH_rx(t)|, and let the amplitude of the phase synchronized HS-PDSCH signal (209) be |HS-PDSCH_chest(t)|. The following equations are then derived:

$$R = |HS\text{-}PDSCH\_tx|/|CPICH\_tx| \quad (13)$$

$$|HS\text{-}PDSCH\_rx(t)| = |fv(t)|^* |HS\text{-}PDSCH\_tx(t)| \quad (14)$$

$$|CPICH\_rx(t)| = |fv(t)|^* |CPICH\_tx(t)| \quad (15)$$

$$|HS\text{-}PDSCH\_chest(t)| = |fv(t)|^2 * |HS\text{-}PDSCH\_tx(t)| * |CPICH\_tx(t)| \quad (16).$$

Consequently, the amplitude of D_std(n) is as shown by the following equation (17), so that the effect of the fading at the time of estimating the threshold value may now be eliminated.

$$|D\_std(n)| = |fv(t)|^2 * |HS\text{-}PDSCH\_tx(t)| * |CPICH\_tx(t)|/(|fv(t)|^2 * |CPICH\_tx(t)|^2) = |HS\text{-}PDSCH\_tx(t)|/|CPICH\_tx(t)| \quad (17)$$

By way of specified operations, various counters are initialized. That is, a data counting counter, a high level counter (count_H), counting the high level (D_H of FIG. 12A), a middle level counter (count_M), counting the middle level (D_M of FIG. 12A), and a low level counter (count_L), counting the low level (D_L of FIG. 12A), are initialized, while the high/low level holding data variables are also initialized (D_L, D_H=0) (step 401 of FIG. 5). Then, responsive to the value of the initially supplied data (D_std(0)), the values of the middle level holding data D_M, and the assumed threshold values Th_L, Th_H are set (step 402 of FIG. 5).

In a step 403, it is not known whether the initially supplied signal D_std(0) is high or low. Thus, a assumed threshold Th_L=⅔*D_std(0) in case the data D_std(0) is assumed to be at a high level (termed 'low assumed threshold', see FIG. 12C) and a assumed threshold Th_H=2*D_std(0) in case the data D_std(0) is assumed to be at a low level (termed 'high assumed threshold', see FIG. 12B) are calculated and set.

The second and the following signals D_std(n) are summed to respective values of the data D_H, D_M and D_L, delimited by the threshold values Th_L and Th_H, from the relative magnitudes of the data D_std(n) with respect to the respective assumed thresholds Th_L and Th_H, to average out the data D_H, D_M and D_L.

In case the data (D_std(n)) is smaller than the low assumed threshold Th_L (Y-branching in a step 404 of FIG. 5), an error (Diff) between the low level holding data D_L and received data D_std(n) is calculated, and the values of the low level holding data (D_L) are averaged out. This averaging out of D_L is by D_L=D_L*(count_L−1)/count_L+D_std(n)/count_L. Additionally, the low level counter count_L is counted up (step 404 of FIG. 5).

In case the data (D_std(n)) is larger than the high assumed threshold Th_H (Y-branching in a step 405 of FIG. 5), an error (Diff) between the high level holding data D_H and received data D_std(n), is calculated, and the received D_std(n) is summed to the high level holding data D_H, in the first counter count_H counting the high level, in order to average out the values of the high level holding data D_H. The high level counter count_H is then counted up (step 406 of FIG. 5). This averaging out of D_H is by D_H=D_H*(count_H−1)/count_H+D_std(n)/count_H.

In case the data D_std(n) is of a value intermediate between the low assumed threshold Th_L and the high assumed threshold Th_H, an error (Diff) between the middle level holding data D_M and the data D_std(n) is found and the data D_std(n) is added to the middle level holding data D_M. The data D_M is then averaged out, while the middle level counter, counting the high level, is counted up (step 407 of FIG. 5). This averaging out of D_M is by D_M=D_M*(count_M−1)/count_M+D_std(n)/count_M.

Using the updated values of the low level holding data D_L, middle level holding data D_M and the high level holding data D_H, the values of the low level assumed threshold Th_L and the high level assumed threshold Th_H are re-calculated e.g. as follows (step 408 of FIG. 5):

$$Th\_L = (D\_L + D\_M)/2; \text{ and}$$

$$Th\_H = (D\_H + D\_M)/2.$$

The value of the data counter (count), counting the data, is compared to a predetermined first value Ndata_L (step 409). If it is the value of the counter that is smaller, it is determined that the number of data is in shortage, and the data counter (count) is incremented (step 410 of FIG. 5). The sequence of operations of decision and averaging as from a signal next to the step 403 of FIG. 5 is further carried out subject to data reception.

If the data counter (count), counting the data, is larger than a predetermined first value Ndata_L, the counter (count) is further compared to a predetermined second value Ndata_H (step 411 of FIG. 5).

If the count value of the data counter (count) is smaller than the second value Ndata_H, it is determined whether or not the error value Diff is sufficiently small. That is, the error value Diff is compared to a predetermined value Noise_Th (step 412). If the error value Diff is larger than Noise_Th, it is assumed that the averaging is as yet not sufficient. Thus, the value of the counter (count) is incremented (step 410 of FIG. 5), and a sequence of decision and averaging operations is further carried out as from a signal next to the step 403.

If, in the decision of step 412 of FIG. 5, the error value Diff is smaller than Noise_Th, or if the count value of the counter (count) is larger than the second value Ndata_H, it is determined that the threshold calculations can be terminated and the threshold corresponding to the larger value of the counter (count_H or count_L) is selected and output (step 413 of FIG. 5.). That is, if, on comparison of the value of the high level counter count_H to the value of the low level counter count_L, it is the value of the high level counter count_H that is larger, it is determined that the first value D_std(0) is low (see FIG. 12B) and the high assumed threshold Th_H is output as the threshold value Th_Std. If it is the value of the counter count_L that is larger, it is determined that the first value D_std(0) is high (see FIG. 12C) and the low assumed threshold Th_L is output as the threshold value Th_Std.

As the output information, a threshold coefficient Th_std; and an absolute value of the threshold=Th_std*(I-CPICH(t)^2+Q-CPICH(t)^2)

are output.

As outputs, the high level holding data D_H and the low level holding data D_L may also be issued.

FIG. 6 is a flowchart for illustrating the operation of a second embodiment of the present invention. In the present embodiment, which is of the successive estimation type, a threshold value per unit time is found each time, without normalization, and reflected in the multi-level QAM (quadrature amplitude demodulation) unit. Thus, the threshold values are distinctly calculated for the I-data (in-phase component) and the Q-data (quadrature component) in order to follow up with the fading. No calculations for normalization are required.

Although the processing of the present embodiment is basically the same as that of the CPICH coefficient type, the I and Q data are used for estimating Threshold_i and Threshold_q of the I and Q data.

In the drawing, if the HS-PDSCH signal following phase synchronization 209 is $I\_HS\text{-}PDSCH\_chest(t)+jQ\_HS\text{-}PDSCH\_chest(t)$, where $j^2=-1$, the symbol D_oneI(n) in the drawing is represented as follows:

$D\_oneI(n)=I\_HS\text{-}PDSCH\_chest(t)$ (18) and $D\_oneQ(n)=Q\_HS\text{-}PDSCH\_chest(t)$ (19).

The counters are initialized (the counter (count), counting the data, the high level counter (count_H), middle level counter (count_M) and the low level counter (count_L), are initialized), and respective level holding data variables are initialized (D_L=0, D_H=0 . . . ) (step 501 of FIG. 6). Responsive to the value of the initially input signal D_oneI(0), the values of the D_M, Th_L and Th_H are set as follows (step 502 of FIG. 6):

$D\_M=D\_oneI(0);$ $Th\_L=\frac{2}{3}*D(0);$ and $Th\_H=2*D(0).$

Since it is not known whether the initially input data signal D_oneI(0) is at a high or low level, the assumed threshold $Th\_L=\frac{2}{3}*D\_oneI(0)$, if the data D_oneI(0) is assumed to be at a high level (see FIG. 12B) and the assumed threshold $Th\_H=2*D\_oneI(0)$, if the data D_oneI(0) is assumed to be at a low level (see FIG. 12C)

are separately calculated and set.

The signals next following the first signal are verified as to how the data D_oneI(n) is related to the respective threshold values Th_L and Th_H. Thus, the data D_oneI(n) is added to the value of D_H, D_M or D_L, divided by the respective threshold value Th_L or Th_H, in order to average out the value of D_H, D_M or D_L.

If the data D_oneI(n) is smaller than Th_L (Y branching of step 503 of FIG. 6), the error Diff between the low level holding data D_L and the data D_oneI(n) is found and the data D_oneI(n) is added to the low level holding data D_L, by way of averaging out the low level holding data D_L, while the low level holding data D_L is counted up (step 504 of FIG. 6). The averaging of D_L is by $D\_L=D\_L*(count\_L-1)/count\_L+D\_oneI(n)/count\_L.$ When the data D_oneI(n) is larger than the high level assumed threshold Th_H (Y-branching of step 505 of FIG. 6), an error Diff between the high level holding data D_H and the data D_oneI(n) is calculated, the data D_oneI(n) is summed to the high level holding data D_H by way of averaging the high level holding data D_H, and the high level counter count_H is counted up (step 506). The averaging of D_H is by $D\_H=D\_H*(count\_H-1)/count\_H+D\_oneI(n)/count\_H.$ When the data D_oneI(n) is of a value intermediate between the low assumed threshold Th_L and the high assumed threshold Th_H, an error Diff between the D_M and the data D_oneI(n) is found, the data D_oneI(n) is summed to D_M for averaging out the D_M, and the middle level counter count_M is counted up (step 507 of FIG. 6). The averaging out of D_M is by $D\_M=D\_M*(count\_M-1)/count\_M+D\_oneI(n)/count\_M.$ Using the updated values of the low level holding data D_L, middle level holding data D_M and the high level holding data D_H, the values of the low assumed threshold Th_L and the high assumed threshold Th_H are re-calculated e.g. as follows (step 508 of FIG. 6):

$Th\_L=(D\_L+D\_M)/2;$ $Th\_H=(D\_H+D\_M)/2.$

If, when the value of the counter Count is compared to the predetermined first value Ndata_L (step 509 of FIG. 6), it is the value of the counter (Count) that is smaller, it is determined that the number of data is in shortage, and the counter is counted up (step 510 of FIG. 6) to carry out the sequence of decision and averaging operations as from a signal next to the step 503 of FIG. 6.

In case the value of the counter (Count) is larger than the first value Ndata_L, the value of the counter (Count) is compared to a predetermined second value Ndata_H (step 511 of FIG. 6).

If it is the value of the counter (count) that is smaller, the error value Diff is compared to a predetermined value Noise_Th (step 512 of FIG. 6). If it is the error value Diff that is larger, the averaging is deemed to be insufficient and processing again proceeds to decision and averaging beginning from step 503 of FIG. 6.

In case it is the error value Diff that is smaller, or the value of the counter (Count) is larger than Ndata_H, a decision is given that the threshold calculations can be terminated. Thus, the counter count_H is compared to the counter count_L and a threshold with a larger count value is selected and output (step 513 of FIG. 6).

That is, if, in the step 513 of FIG. 6, it is the value of the count_H that is larger, a decision is made that the first value D_oneI(0) is at a low level (FIG. 12(b)) and the high assumed threshold Th_H is output as the threshold value Threshold_i.

If conversely the value of the count_L is larger than the value of the counter count_H, a decision is made that the first value D_oneI(0) is at a high level (FIG. 12(c)) and the low assumed threshold Th_H is output as the threshold value Threshold_i.

In the present embodiment, the operation similar to that for the processing for the I data is carried out for the Q data, using Q data D_oneQ(n) in place of the I data D_oneI(n), on order to calculate the threshold Threshold_q for the Q axis.

In the present embodiment, outputs are absolute values of the threshold values for the I and Q axes. It is however possible to output high level holding data D_H and low level holding data D_L.

Figure 7:
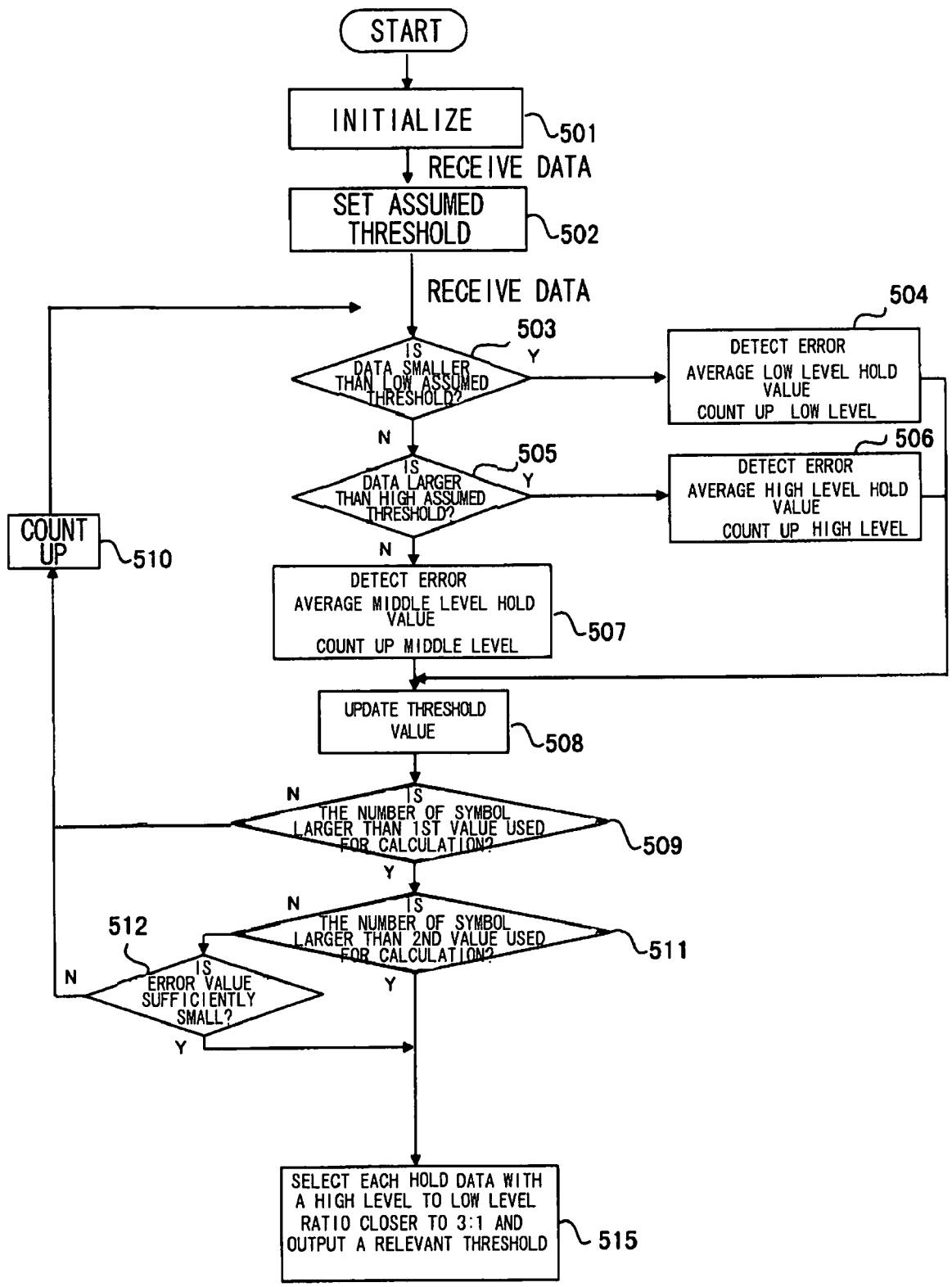
FIG. 7 is a flow diagram for illustrating another typical processing operation of the threshold value detection unit 211 according to a third embodiment of the present invention.

The processing sequence of a further embodiment of the present invention is now explained. FIG. 7 depicts a flowchart for illustrating the further embodiment of the present invention. Since the processing of steps 501 to 512 is similar to that shown in FIG. 6, the corresponding explanation is omitted. In the present embodiment, the processing of selecting the value with the ratio of the level holding data closer to 3:1 and outputting the associated threshold value is carried out.

Figure 8:
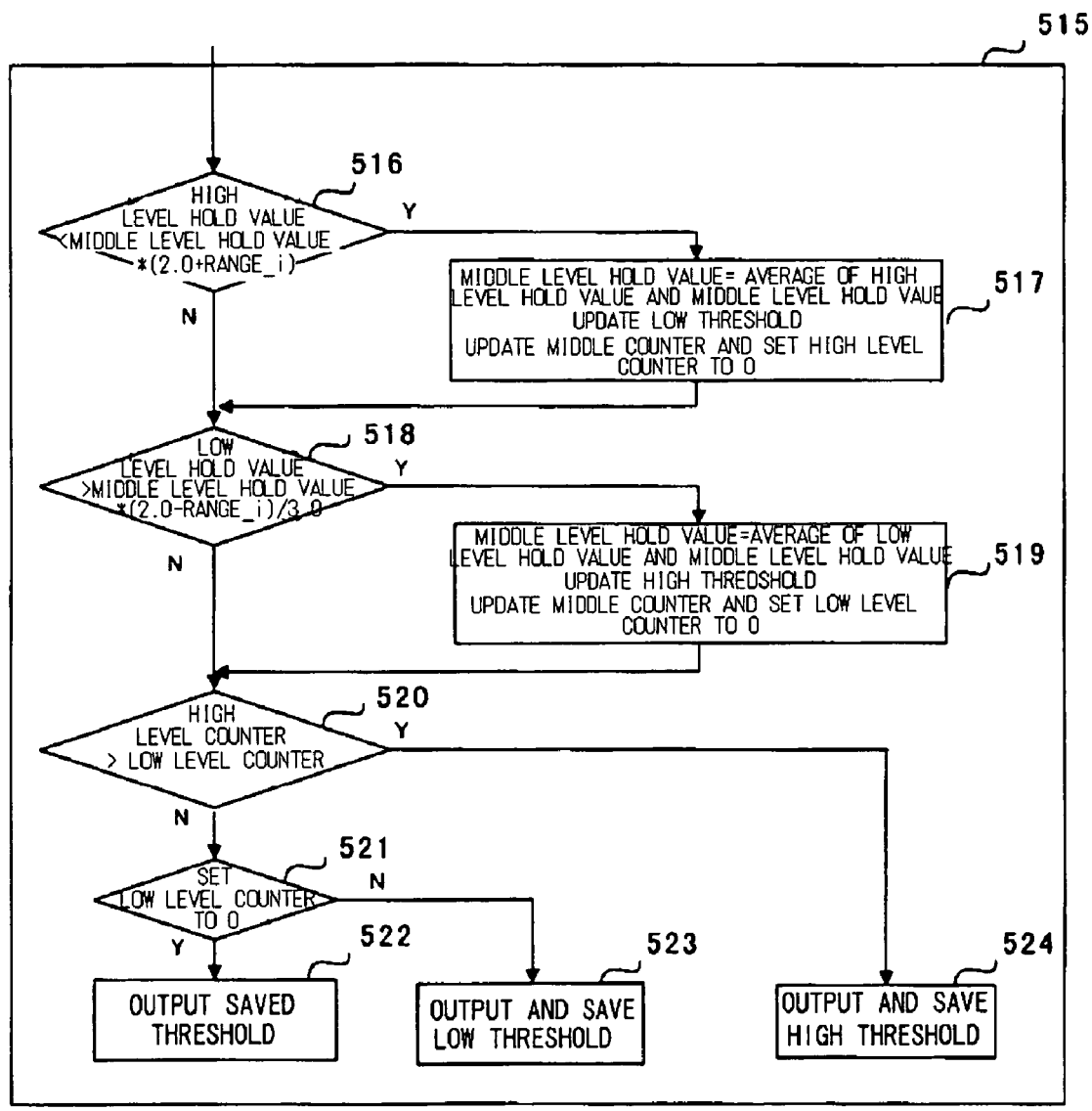
FIG. 8 is a flow diagram for illustrating the operation of a step 515 of FIG. 7.

FIG. 8 shows an instance of details of the step 515 of FIG. 7 as an example. Referring to FIG. 8, the operation of the present embodiment is explained.

In case the high level holding value is smaller than the middle level holding value×(2.0+Range_i) (Y-branching of step 516 of FIG. 8), the middle level holding value (D_M) is found as an average value of the high level holding value (D_H) and the middle level holding value (D_M), and the low assumed threshold (Th_L) is updated by the low level holding value (D_L) and the middle level holding value (D_M). The value of the high level counter (count_H) is summed to the value of the middle level counter (count_M) and the high level counter is cleared to zero (step 517 of FIG. 8). Although the parameter Range_i is set to say 1.0, it may be varied to other suitable values.

In case the low level holding value is larger than the middle level holding value×(2.0+Range_i) (Y-branching of step 518), the middle level holding value (D_M) is found as an average value of the low level holding value (D_L) and the middle level holding value (D_M), and the high assumed threshold (Th_H) is updated by the high level holding value (D_H) and the middle level holding value (D_M). The value of the low level counter (count_L) is summed to the value of the middle level counter (count_M) and the low level counter is cleared to zero (step 519 of FIG. 8).

The high level counter (count_H) is compared to the low level counter (count_L) and, in case it is the high level counter that is larger, the absolute value of the high assumed threshold Th_H is output and saved (step 524). In case the low level counter is larger and is not zero, the absolute value of the low assumed threshold Th_L is output and saved (step 523 of FIG. 8).

On the other hand, if there is no proper ratio (that is, in case the low level counter is zero), the calculated value saved in the previous calculations is used (step 522 of FIG. 8). In the present embodiment, the absolute values of the threshold values of the I and Q axes are output. It is however possible to output the high level holding data D_H and the low level holding data D_L.

Figure 9:
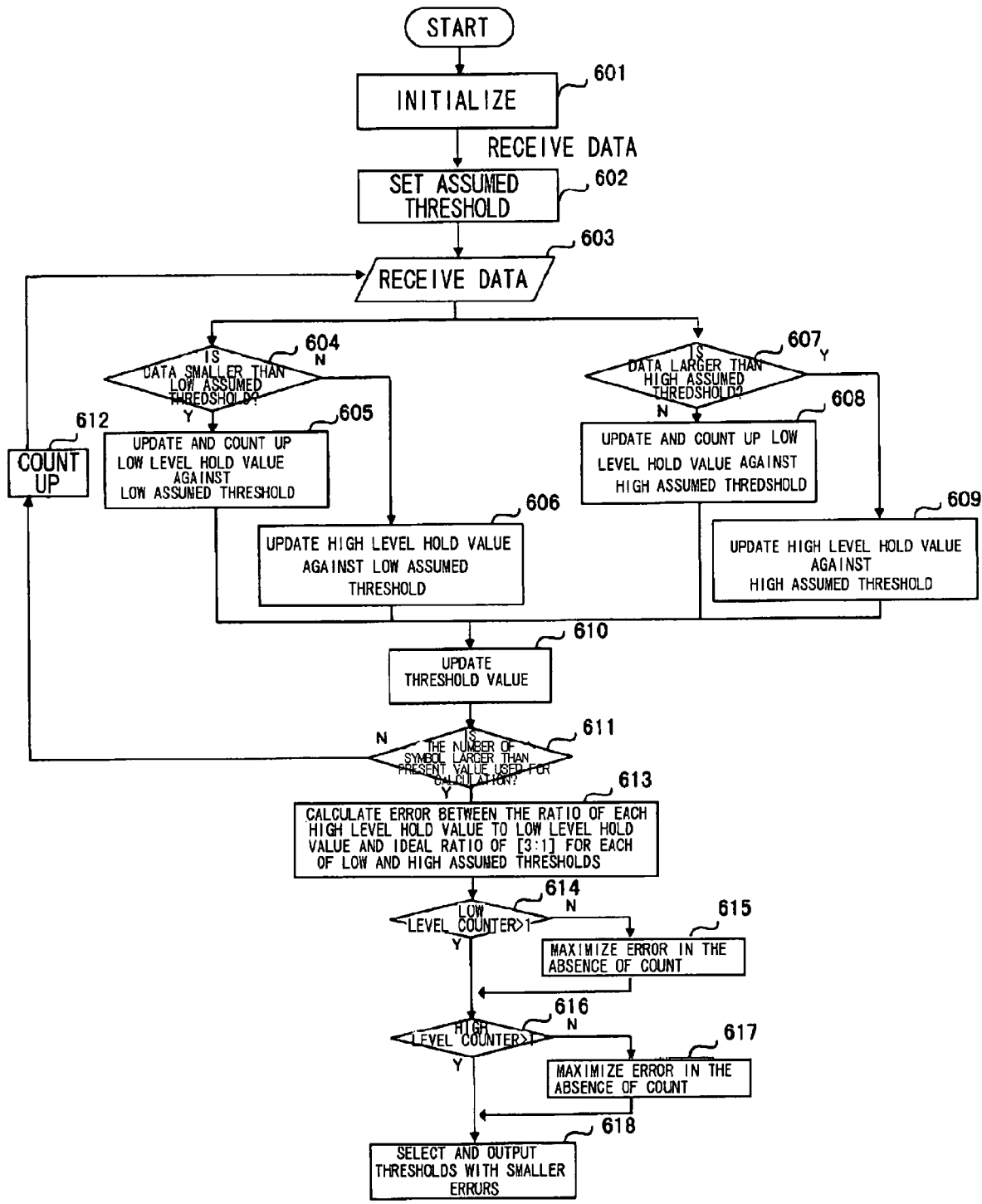
FIG. 9 is a flow diagram for illustrating another typical processing operation of the threshold value detection unit 211 according to a fourth embodiment of the present invention.

FIG. 9 depicts a flowchart for illustrating the processing sequence of a still further embodiment of the present invention. Here, two thresholds Th_H, Th_L are assumed and, when each two data divided by the two thresholds (high level holding data and low level holding data divided by the high assumed threshold Th_H and low level holding data and high level holding data divided by the low assumed threshold Th_L), are updated, a value obtained by multiplying a predetermined coefficient to the difference of the subsequently received data from the level holding value for corresponding level is summed to the value of each level holding data. That is, the received data is not summed to the held data to average out the held data. In this modification, the calculations are simpler than in the case of the averaging the held level data to make for reduction of the volume of calculations and speedup of the calculations.

In an initializing step 601 of FIG. 9, the data counter, and the counters count_H, count_MH, count_ML and the count_L, counting D_H, D_MH, separated from each other by the threshold Th_H, and D_ML, D_L, separated from each other by the threshold Th_L, are initialized, whilst error variables Diff_Lt and Diff_Ht are also initialized.

Based on the first received data (D_one(0)), the low assumed threshold (Th_L) and the high assumed threshold (Th_H) are set in a step 602 of FIG. 9 (Th_L=⅔D_one(0); Th_H=2*D_one(0)) and the data holding variables are initialized (D_ML=D_MH=D_(one(0); D_H=3*D_one(0); D_L=D_one(0)/3).

The data (D=one(n)) is received (step 603 of FIG. 9). It is determined whether or not the data received is smaller than the low assumed threshold (Th_L) (step 604 of FIG. 9). If the data received is smaller, the low level holding value for the low assumed threshold is updated and the low level counter (count_L) is counted up (step 605 of FIG. 9). The updating of the low level holding value for the low assumed threshold is executed, e.g. with the following calculation:

$$D\_L=D\_L+\text{Factor}*(D\_one(n)-D\_L),$$

where Factor is a preset coefficient.

In case the data is larger than the low assumed threshold (Th_L), the high level holding value (D_ML) for the low assumed threshold is updated and the counter (count_ML) is counted up (step 606 of FIG. 9). The updating of the high level holding value (D_ML) for the low assumed threshold is executed, e.g. with the following calculation:

$$D\_ML=D\_ML+\text{Factor}*(D\_one(n)-D\_ML).$$

It is decided whether or not the data is larger than the high assumed threshold (Th_H) and, if the data is larger, the high level holding value for the high assumed threshold is updated and the high level counter (count_H) is counted up (step 609 of FIG. 9). The updating of the high level holding value for the high assumed threshold is executed, e.g. with the following calculation:

$$D\_H = D\_H + \text{Factor}*(D\_\text{one}(n) - D\_H).$$

In case the data is smaller than the high assumed threshold (Th_H), the low level holding value for the high assumed threshold is updated and the counter (count_MH) is counted up (step 608 of FIG. 9). The updating of the low level holding value for the high assumed threshold is executed, e.g. with the following calculation:

$$D\_MH = D\_MH + \text{Factor}*(D\_\text{one}(n) - D\_MH).$$

In a step 610 of FIG. 9, the high assumed threshold (Th_H) and the low assumed threshold (Th_L) are updated e.g. as follows:

$$Th\_H = (D\_L + D\_ML)/2;$$

$$Th\_L = (D\_H + D\_MH)/2.$$

In case the data counter value is not up to a preset value or higher, the data counter is counted up, and the processing as from a signal next to the reception of data is repeated (steps 611 and 612 of FIG. 9).

In case a number not less than a preset number of data has been used for threshold calculations, an error between the ratio of each high level holding value and the low level holding value and an ideal value of the same ratio, e.g. 3:1, is calculated, for each of the low and high assumed threshold values, in accordance with say the following equation (step 613 of FIG. 9):

$$\text{DiffL}\_t = |D\_L - D\_ML/3.0|; \text{ and}$$

$$\text{DiffH}\_t = |D\_H - D\_MH*3.0|.$$

In case the value of the low level counter is 1 or less, the error(DiffL_t) is set to a predetermined value (steps 614 and 615 of FIG. 9).

In similar manner, when the value of the high level counter is 1 or less, the error (DiffH_t) is set to a predetermined value (steps 616 and 617 of FIG. 9).

A smaller one of the errors (DiffL_t, DiffH_t) is selected and an associated threshold is output (step 618 of FIG. 9). As outputs, absolute values of the threshold values for the I and Q axes are output. Meanwhile, D_H, D_MH or D_ML, D_L may also be output.

As a modification of FIG. 9, the updating of the level holding values of steps 605, 606, 608 and 609 may be replaced by averaging processing. In such case, the processing in the steps 605, 606, 608 and 609 becomes the averaging processing of $$D\_L = D\_L*(\text{count}\_L - 1)/\text{count}\_L + D\_\text{one}I(n)/\text{count}\_L;$$

$$D\_ML = D\_ML*(\text{count}\_ML - 1)/\text{count}\_ML + D\_\text{one}I(n)/\text{count}\_ML;$$

$$D\_H = D\_H*(\text{count}\_H - 1)/\text{count}\_H + D\_\text{one}I(n)/\text{count}\_H; \text{ and}$$

$$D\_MH = D\_MH*(\text{count}\_MH - 1)/\text{count}\_MH + D\_\text{one}I(n)/\text{count}\_MH$$

respectively.

FIG. 10 is a flowchart showing the processing sequence of a further embodiment of the present invention. In the present embodiment, two threshold values (Th_H and Th_L) are assumed from the initially received data, and, as for subsequently received signals, which of each two data, divided by these two threshold values, namely D_H and D_MH divided by Th_H and D_ML and D_L divided by Th_L, is closer to the ratio of 3:1, is determined, and the threshold closer this ratio is output. In this case, the absolute values of the differences of the values D_H and D_M, determined each time, are summed together, using the totality of the data used for the calculations, the sums of the differences of the values D_H and D_MH are compared to the sum of the differences of the values D_ML and D_L and the threshold with a smaller sum value is selected.

In a step 701 of FIG. 10, for initialization, the data counters, namely the counters count_H, count_MH, count_ML and count_L, counting D_H and D_MH divided by the threshold Th_H and D_ML and D_L divided by Th_L, respectively, are initialized, whilst the error variables Diff_Lt and Diff_Ht are initialized.

Based on the initial received data (D_one(0)), a assumed threshold is set in a step 702 of FIG. 10. That is, the low assumed threshold (Th_L) and the high assumed threshold (Th_H) are set (Th_L=⅔D_one(0); Th_H=2*D_one(0)) and the data holding variables are initialized (D_ML=D_MH=D_one(0), D_H=3* D_one(0), D_L=D_one(0)/3).

In a step 703 of FIG. 9, data (D_one(n)) is received. If the data is smaller than the low assumed threshold (Th_L) (Y-branching in 704 of FIG. 10), data is held in a memory, the low level holding value (D_L) relevant to the low assumed threshold is averaged, and the low level counter (count_L) is counted up (step 705 of FIG. 10). The averaging of D_L is calculated with the following equation:

$$D\_L = D\_L*(\text{count}\_L - 1)/\text{count}\_L + D\_\text{one}I(n)/\text{count}\_L.$$

In case the data is not less than the low assumed threshold (Th_L), the data is held in a memory. The high level holding value (D_ML) relative to the low assumed threshold (Th_L) is averaged and the counter (count_ML) is counted up (step 706 of FIG. 10). The averaging of D_M is calculated with the following equation:

$$D\_ML = D\_ML*(\text{count}\_ML - 1)/\text{count}\_ML + D\_\text{one}I(n)/\text{count}\_ML.$$

In case the data is larger than the high assumed threshold (Th_H) (Y-branching of step of FIG. 10), the data is held in the memory, the high level holding value relative to the high assumed threshold is averaged, and the high level counter (count_H) is counted up (step 708 of FIG. 10). The averaging of D_H is calculated with the following equation:

$$D\_H = D\_H*(\text{count}\_H - 1)/\text{count}\_H + D\_\text{one}I(n)/\text{count}\_H.$$

In case the data is not larger than the high assumed threshold (Th_H), the data is held in the memory, the low level holding value relative to the high assumed threshold is averaged, and the high level counter (count_MH) is counted up (step 709 of FIG. 10). The averaging of D_MH is calculated by the following equation:

$$D\_MH = D\_MH*(\text{count}\_MH - 1)/\text{count}\_MH + D\_\text{one}I(n)/\text{count}\_MH.$$

In a step 710 of FIG. 10, the high assumed threshold (Th_H) and the low assumed threshold (Th_L) are updated (for example, Th_H=(D_L+D_ML)/2;Th_L=(D_H+D_MH)/2).

If the value of the data counter is not above a predetermined value, the data counter is counted up and the processing as from data reception is repeated (steps 711 and 712 of FIG. 10).

When more than a predetermined number of data has been received, a sum of errors (cumulative sum of absolute values) between data determined to be high relative to the low assumed threshold (Th_L) (held in an array) and the ultimate high level value (D_ML) is calculated (step 713 of FIG. 10).

A sum of errors (cumulative sum of absolute values) between data (held in an array) determined to be low relative to the low assumed threshold (Th_L) and the ultimate low hold value (D_L) is calculated (step 714 of FIG. 10). The error of step 713 is summed to the error calculated in step 714. It is noted that, when the value of the low level counter (count_L) is 1, the error is set to a predetermined value (maximum value), say 1000 (step 715 of FIG. 10).

When more than a predetermined number of data has been received, a sum of error between data (held in an array) determined to be high relative to the high assumed threshold (Th_H) and the ultimate high level value (D_H) is calculated (step 716 of FIG. 10).

A sum of errors (cumulative sum of absolute values) between data (held in an array) determined to be low relative to the high assumed threshold (Th_H) and the ultimate low hold value (D_MH) is calculated (step 717 of FIG. 10). The error of step 717 is summed to the error calculated in step 716. It is noted that, when the value of the high level counter (count_H) is 1, the error is set to a predetermined value, say 10000 (step 718 of FIG. 10).

The sum of the errors between the low and the high of the assumed threshold Th_L is compared to the sum of the errors between the low and the high of the assumed threshold Th_H, and a threshold value with a smaller sum value is selected and output (719 of FIG. 10). The outputs are absolute values of the thresholds of the I and Q axes. It is noted that D_H, D_MH or D_ML, D_L may also be output.

The averaging processing for the low level holding values of steps 705 and 706, the averaging processing for the high level holding value of the step 708 and the averaging processing for the low level holding values of step 706 may, of course, be replaced by the updating processing of $$D\_L = D\_L + Factor*(Data(n) - D\_L),$$

$$D\_ML = D\_ML + Factor*(Data(n) - D\_ML),$$

$$D\_H = D\_H + Factor*(Data(n) - D\_H) \text{ and}$$

by $D\_MH = D\_MH + Factor*(Data(n) - D\_MH)$, where Data (n) is data received in the step 703 and Factor is a predetermined coefficient, respectively.

Figure 13C:
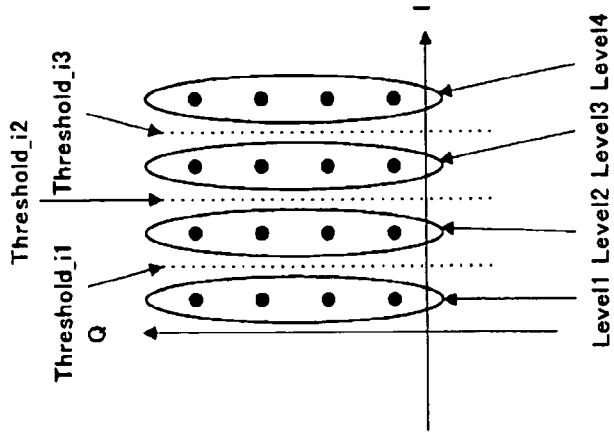
FIGS. 13A, 13B and 13C illustrate the second embodiment of the present invention.
Figure 13B:
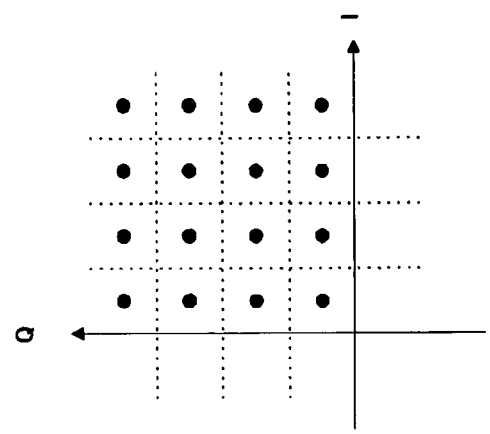
Figure 13A:
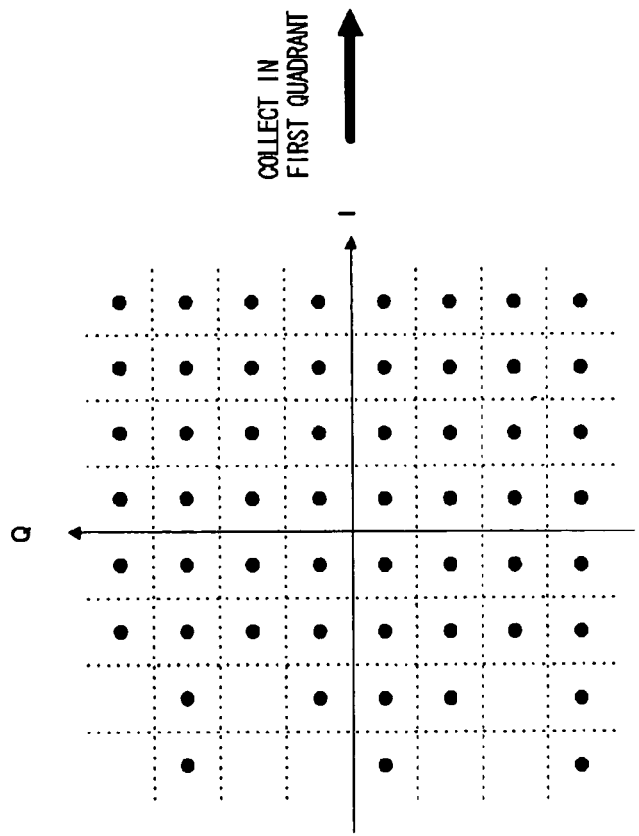

FIGS. 13A-13C are schematic views for illustrating that a method similar to one for 16-level QAM may be used even for 64-level QAM. FIG. 13A shows 64-level QAM signals, whilst FIG. 13B shows the same signals, moved to the first quadrant.

As may be seen from FIG. 13C, the I data is made up by four levels and three threshold values. The same processing is performed for Q-data.

Figure 14:
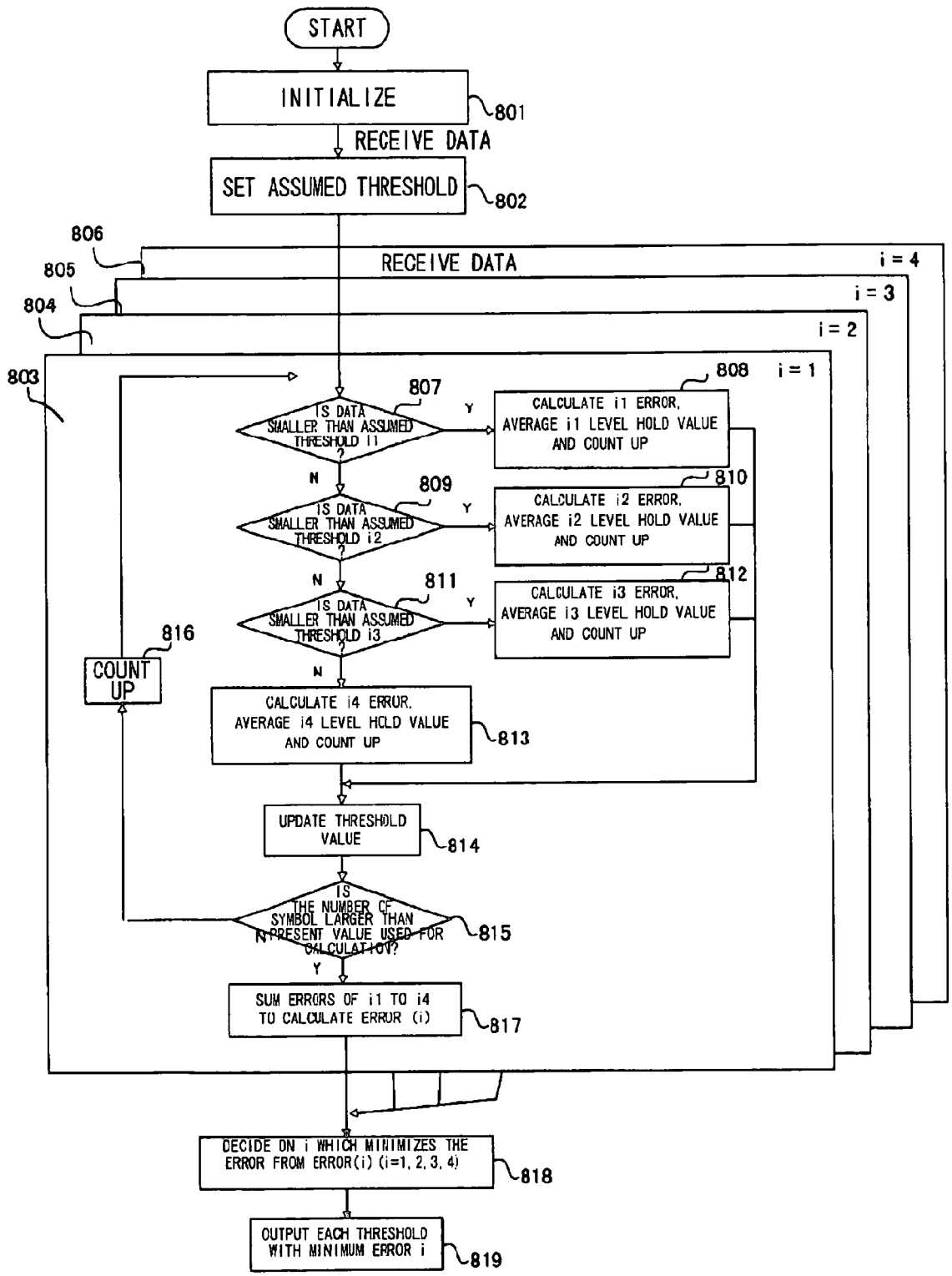
FIG. 14 is a flow diagram for illustrating an example of a specified operation of the second embodiment of the present invention (64-level QAM).

FIG. 14 is a flow diagram showing the processing sequence for 64-level QAM according to a second embodiment of the present invention. The present embodiment is of the successively estimated type, as in the case of FIG. 6.

A step 801 in FIG. 14 is an initializing step. Specifically, counters (count_i1, count_i2, count_i3, count_i4) (i=1 to 4) for counting data of the respective levels, divided by threshold values (Th_i1, Th_i2 and Th_i3) (i=1 to 4), relevant for the case where the initial received data are assumed to be of the level i (i=1 to 4), and associated level holding data variables (DL_i1, DL_i2, DL_i3 and DL_i4) (i=1 to 4), are initialized.

In addition, a counter (count_i) used for data count in steps 803 to 806 as later explained, is initialized.

Responsive to the value of the initially supplied signal D=oneI(0), assumed thresholds are set (step 802 of FIG. 14).

It is not known which one of the four levels the initially supplied data D_oneI(0) belongs to. Thus, the assumed thresholds in case the initially input data D_oneI(0) is assumed to be of the smallest level (level 1), that is $$Th\_11 = D\_oneI(0)/0.5;$$

$$Th\_12 = Th\_11*2; \text{ and}$$

$$Th\_13 = Th\_11*3$$

are calculated and set.

The assumed thresholds in case the initially input data D_oneI(0) is assumed to be of the next smallest level (level 2), that is $$Th\_21 = D\_oneI(0)/1.5;$$

$$Th\_22 = Th\_21*2; \text{ and}$$

$$Th\_23 = Th\_21*3$$

are then calculated and set.

The thresholds in case the initially input data D_oneI(0) is assumed to be of the next larger level to the level 2 (level 3), that is $$Th\_31 = D\_oneI(0)/2.5;$$

$$Th\_32 = Th\_31*2; \text{ and}$$

$$Th\_33 = Th\_31*3$$

are then calculated and set.

The thresholds in case the initially input data D_oneI(0) is assumed to be of the largest level (level 4), that is $$Th\_41 = D\_oneI(0)/3.5;$$

$$Th\_42 = Th\_41*2; \text{ and}$$

$$Th\_43 = Th\_41*3$$

are then calculated and set.

The level holding data and the counters are then set. That is, the initial received data D_oneI(0) is substituted into the level holding data variables DL_11, DL_22, DL_33 and DL_44, in meeting with the supposition that the initially supplied data D_oneI(0) are of the levels 1, 2, 3 and 4, respectively, and the counters count_11, count_22, count_33 and count_44 are each incremented by one.

After the initial signal, it is determined how the received data D_oneI(n) are related with the respective thresholds Th_i1, Th-i2 and Th_i3 where D_oneI(0) is assumed to be of the levels 1, 2, 3 and 4 for i=1, 2, 3 and 4, respectively. The received data are summed to level holding data DL_i1, DL_i2, DL_i3 and DL_i4, divided by the three thresholds Th_i1, Th_i2 and Th_i3, by way of averaging (i=1, 2, 3 and 4).

In case data D_oneI(n) is smaller than the threshold Th_i1 (Y-branching of step 807 of FIG. 14), an error Diff between the level holding data DL_i1 and the data D_oneI(n) is found, DL_i1 is summed to D_oneI(n) for averaging, and the counter count_i1 is counted up (step 808 of FIG. 14). The averaging of DL_i1 is calculated with the following equation:

$$DL\_i1 = DL\_i1*(count\_i1-1)/count\_i1 + D\_oneI(n)/count\_i1.$$

In case the data D_oneI(n) is not less than Th_i1 and smaller than Th_i2 (step 809), an error Diff between DL_i2 and D_oneI(n) is found and D_oneI(n) is summed to DL_i2 for averaging. The counter count_i2 is counted up (step 810). The averaging of DL_i2 is calculated with the following equation:

$$DL\_i2=DL\_i2*(count\_i2-1)/count\_i2+D\_oneI(n)/count\_i2.$$

In case the data D_oneI(n) is not less than Th_i2 and smaller than Th_i3 (Y-branching of step 811), an error Diff between DL_i3 and D_oneI(n) is found and D_oneI(n) is summed to DL_i3 for averaging. The counter count_i3 is counted up (step 812 of FIG. 14). The averaging of DL_i3 is calculated with the following equation:

$$DL\_i3=DL\_i2*(count\_i3-1)/count\_i3+D\_oneI(n)/count\_i3.$$

In case the data D_oneI(n) is not less than Th_i3, an error Diff between DL_i4 and D_oneI(n) is found and summed to DL_i4 for averaging. The counter count_i4 is counted up (step 813 of FIG. 14). The averaging of DL_i4 is calculated with the following equation:

$$DL\_i4=DL\_i4*(count\_i4-1)/count\_i4+D\_oneI(n)/count\_i4.$$

The thresholds Th_i1, Th_i2 and Th_i3 are then updated in accordance with say the following equations:

$$Th\_i1=(DL\_i1+DL\_i2)/2;$$

$$Th\_i2=(DL\_i2+DL\_i3)/2; \text{ and}$$

$$Th\_i3=(DL\_i3+DL\_i4)/2.$$

For cases of i=2, 3 and 4, the same data D_oneI(n) is processed in similar manner with comparison, averaging and threshold updating.

The value of the counter count_i is compared to a predetermined value Ndata_L (step 815 of FIG. 14). If it is found that it is the value of the counter count_i1 that is smaller, it is determined that the number of data is in shortage. The value of the counter count_i is then counted up (step 816 of FIG. 14) and the sequence of processing for decision and averaging is then carried out as from a signal next to the step 807 of FIG. 14.

In case the value of the counter count_i is larger than Ndata_L, the sum or an average value Diff_i of the latest error values of D_oneI(n) with respect to each assumed data DL_i1, DL_i2, DL_i3 and DL_i4, that is Diff_i1, Diff_i2, Diff_i3 and Diff_i4, is calculated (step 817 of FIG. 14).

The sequence of operations from step 807 to step 817 of FIG. 14 is carried out depending on which one of the multiple levels is the assumed level of the initial data D_oneI(0), specifically, by setting i=1 in case the assumed level is the level 1 (step 803), i=2 in case the assumed level is the level 2 (step 804 of FIG. 14), i=3 in case the assumed level is the level 3 (step 805 of FIG. 14) and by setting i=4 in case the assumed level is the level 4 (step 806).

By deciding the minimum value of the error value Diff(i) as the result of each assumption, it is determined which assumption has been correct, and the value of an index i is set as being the minimum value (min) (step 818 of FIG. 14).

The values of the respective thresholds for which i=min are output (step 819 of FIG. 14):

$$Threshold\_1=Th\_min1;$$

$$Threshold\_2=Th\_min2; \text{ and}$$

$$Threshold\_3=Th\_min3.$$

Figure 15:
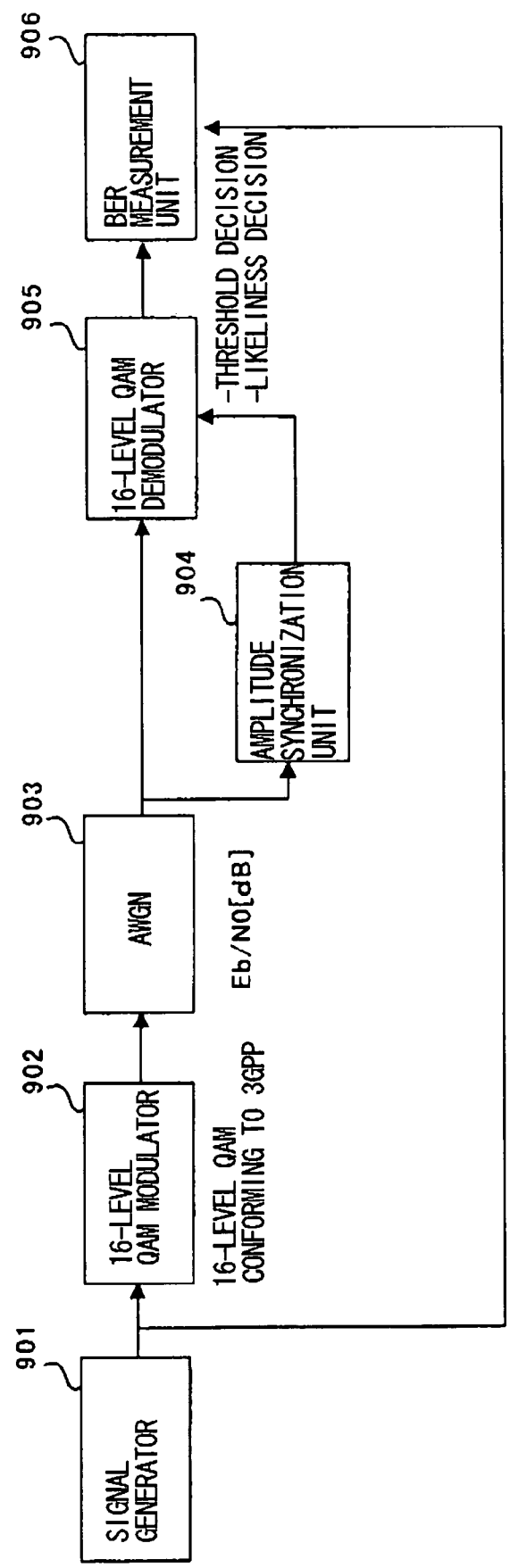
FIG. 15 illustrates a system configuration for the simulation.

FIG. 15 depicts a system configuration of the simulation for evaluating the result of threshold estimation according to the present invention. Specifically, the system is made up by a signal generator 901 for generating a random pattern, an unbalance pattern and so forth, a modulator 902 supplied with an output of the signal generator 901 as an input and which is configured for carrying out the 16-level QAM modulation pursuant to 3GPP, an AWGN (add white Gaussian noise to signal) 903, having an output of the signal generator 901 as an input and which is configured for adding the white Gaussian noise, an amplitude synchronization unit 904, a 16-level QAM demodulator 905 for executing threshold decision and likelihood decision, and a BER (bit error rate) measurement unit 906. The amplitude synchronization unit 904 corresponds to the amplitude synchronization detection unit 161.

Figure 16A:
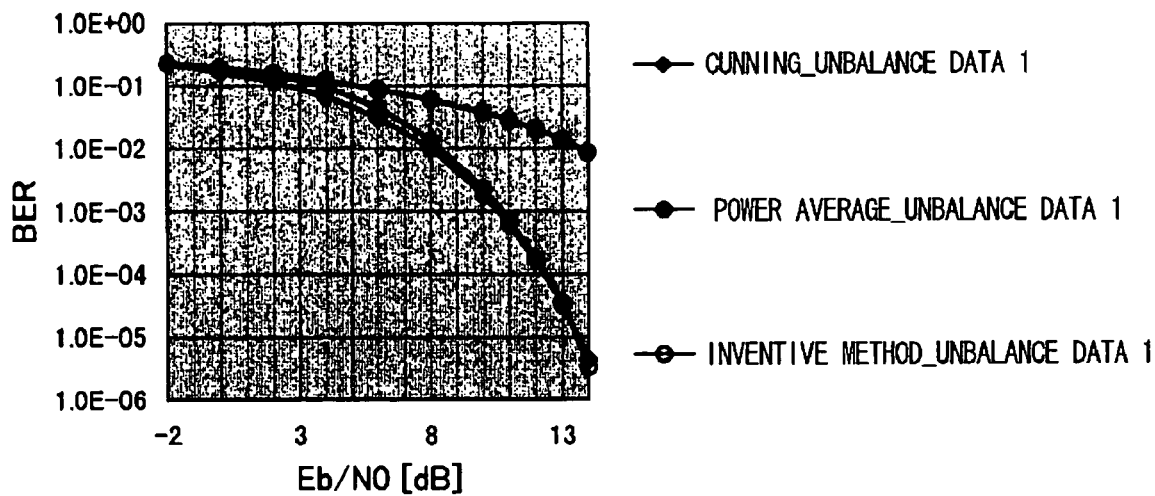
FIGS. 16A and 16B show the results of the simulation.
Figure 16B:
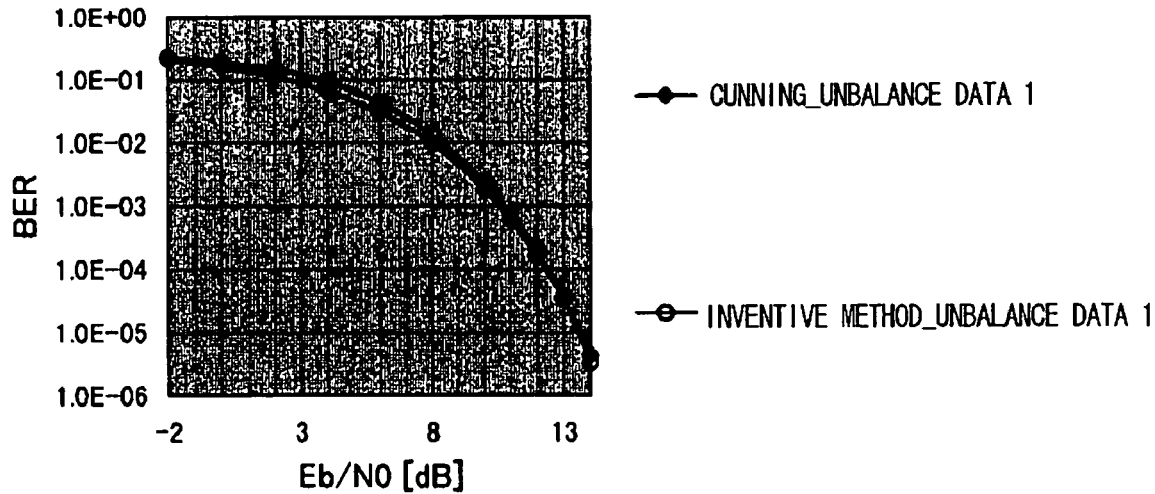

FIGS. 16A and 16B show the 16-level QAM threshold estimating method, according to the present invention, along with another Comparative Example. The vertical(Y) and horizontal(X) axes in FIGS. 16A and 16B denote the BER (bit error rate) and the Eb/No (dB), that is, the energy/noise power density per bit, respectively. In FIG. 16A, unbalanced data are output from the signal generator 901. That is, 0 and 1 are output at a rate of 11:1 and three symbols, that is, a symbol (low, low) a symbol (low, low) and a symbol (low, high) . . . are repeated as 16-level QAM symbols. Meanwhile, in power averaging, the amplitude is estimated, as it is deemed that random data is being sent, from an average value of the amplitude of the received data I and Q.

In FIGS. 16A and 16B, white circles represent the threshold estimating method of the present invention, indicated in FIGS. 9 and 10, respectively. Specifically, these white circles indicate that the unbalanced data of the present invention testify to satisfactory characteristics, close to cunning data, against unbalanced data. The amplitude synchronization unit 904 executes threshold estimation shown in FIGS. 9 and 10. It is noted that the white circles in FIGS. 16A and 16B use the averaging processing as the update processing in steps 605, 606, 608 and 609 of FIG. 9.

Figure 17:
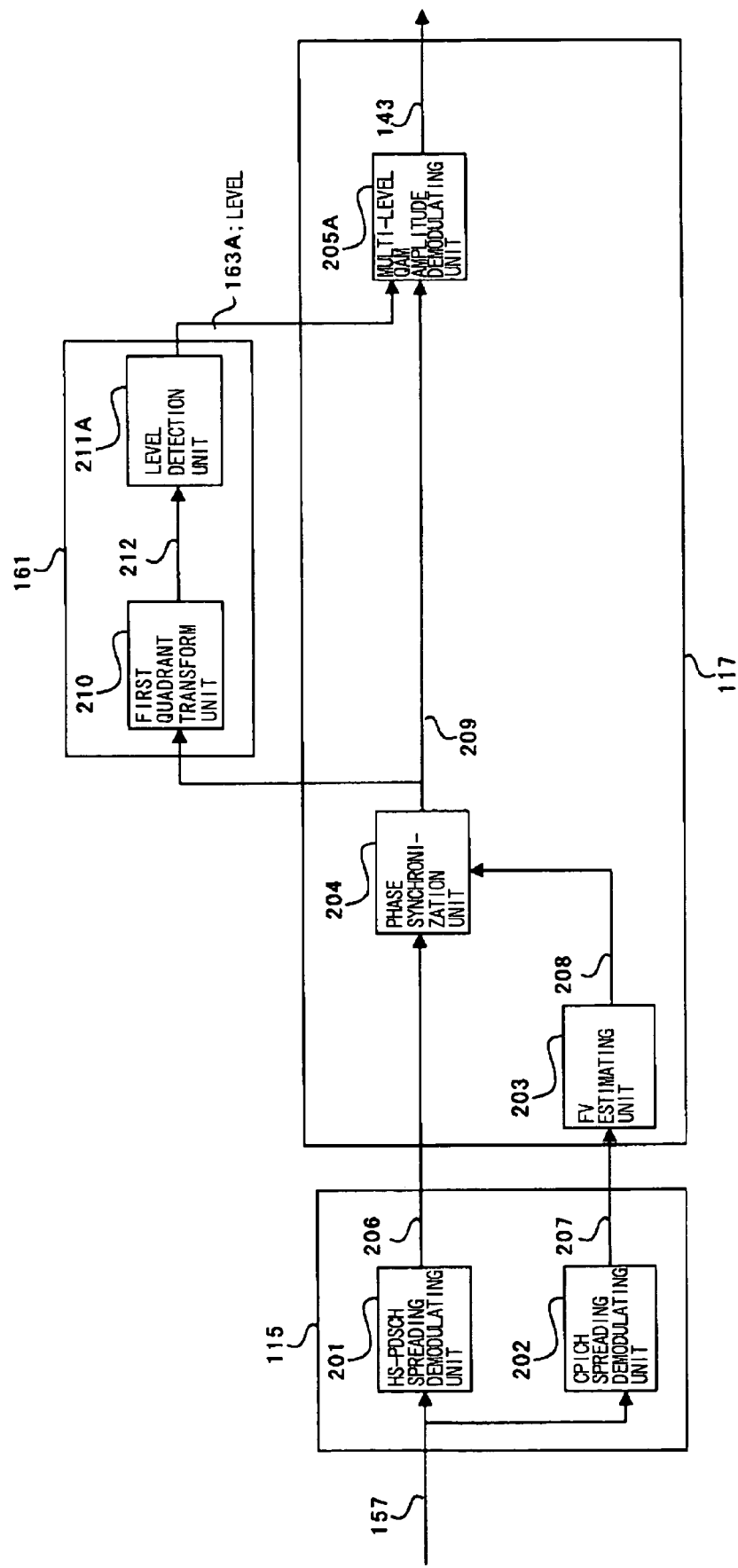
FIG. 17 shows the configuration of a modified embodiment of the present invention.

FIG. 17 shows the structure of a multi-level QAM amplitude synchronization detection unit 161 according to a modification of the present invention. In the present embodiment, the FV information 208 from the FV estimating unit 203 is supplied only to the phase synchronization unit 204. A level detection unit 211A calculates the level of the multi-level QAM, from a first quadrant signal 212 output from the first-quadrant transformation unit 210, and from an FV 208, and routes a level signal 163A to a multi-level QAM amplitude demodulating unit 205A. This multi-level QAM amplitude demodulating unit 205A performs the likelihood decision from the HS-PDSCH I and Q signals and the level signal 163A to demodulate the amplitude to output the multi-level QAM demodulated signal 143.

Although the present invention has been described with reference to the above embodiments, the present invention is not limited to these embodiments and, as may be apparent to those skilled in the art, various changes or corrections may be envisaged without departing from the scope and the purport of the invention as defined in the appended claims.

The meritorious effects of the present invention are summarized as follows.

With the method and apparatus of the present invention, described above, threshold values may be estimated from the data, in the reception of the multi-level QAM signal, even in case the amplitude information is not definitely supplied from the transmitting side to the receiving side, to render it possible to demodulate the data.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method for estimating a threshold value in deciding data along an amplitude by a terminal performing wireless communication with a wireless station in accordance with multi-level QAM (quadrature amplitude modulation), said method comprising executing a sequence of instructions in said terminal for:
   presupposing in which one of multiple levels can be a level of a received data signal and setting up a plurality of threshold values assumed (referred to herein as 'assumed threshold values') in association with said presupposition, said received data signal being transmitted without a synchronization signal along an amplitude direction;
   updating sequentially the assumed threshold values based on received data; and
   selecting an ultimate threshold value from said plural assumed threshold values, said selecting including:
      calculating a difference between ratios between low level data and high level data separated by said plural assumed threshold values and a predetermined ratio; and
      selecting a threshold value with a smaller difference.

2. The method according to claim 1, wherein said selecting includes selecting one threshold value based on a number of times of occurrence of the data pertaining to respective levels partitioned by said assumed threshold values.

3. The method according to claim 1, wherein said selecting the threshold value further comprises:
   deciding that there exists no proper value if said difference is larger than said predetermined value, and a value calculated last time is used as the threshold value.

4. The method according to claim 1, wherein said selecting includes selecting a threshold value with a smaller difference of calculated average data of the plural data from respective received data.

5. The method according to claim 1, wherein in said selecting, in performing a selecting a threshold value with a smaller difference of calculated average data of the plural data from respective received data, it is determined that a proper value is lacking and a previous threshold value is used, if said difference is larger than a predetermined value.

6. The method according to claim 1, wherein said updating includes presuming data positions for a totality of plural assumed threshold values, from one received data to another, and calculating the totality of the assumed threshold values.

7. The method according to claim 1, wherein said updating detects to which level belongs the received data, for said assumed threshold values, and wherein, of said plural assumed threshold values, a certain one or ones may not be updated each time the data is received.

8. The method according to claim 1, further comprising transforming phase-synchronized received multi-level QAM data into data in a first quadrant of a coordinate system of I and Q axes, wherein
   said data transformed into the data of the first quadrant is used as the data used in calculating the threshold values in said presupposing and updating steps.

9. The method according to claim 8, wherein said transforming the data to said first quadrant includes a step of moving the data into said first quadrant by taking an absolute value of the multi-level QAM data or by rotating the multi-level QAM data.

10. The method according to claim 1, further comprising:
    normalizing the received data using a fading vector; and
    providing a threshold value for amplitude demodulation as a coefficient for the fading vector to follow a fading.

11. The method according to claim 1, further comprising calculating a threshold value from received data and re-calculating the threshold value with a relatively short period for following a fading.

12. The method according to claim 1, wherein
    in a case a number of data used for calculating the threshold value exceeds a preset number, the updating of the assumed threshold value is terminated and wherein
    one of a plurality of assumed threshold values is selected in said selecting.

13. The method according to claim 1, wherein
    in a case a number of data used for calculating the threshold value exceeds a preset number, and an error between a value of the level of the multiple levels corresponding to said assumed threshold value and the data satisfies a preset condition, the updating of the assumed threshold value is terminated, and wherein
    one of a plurality of said assumed threshold values is selected in said selecting.

14. The method according to claim 1, further comprising:
    deciding which assumption has been correct, based on a frequency of occurrence of the data in a level of the multiple levels corresponding to said assumed threshold value and/or on an error of the received data with respect to each assumed level of the multiple levels, to determine a threshold value; and
    effecting an amplitude demodulation using said threshold value.

15. The method according to claim 1, wherein
    amplitude information is not definitely supplied from a wireless base station of a transmitting side to a terminal of a receiving side as a synchronization signal;
    wherein said terminal assumes, at an outset, a plurality of possibilities as to which level said data belongs to, in said presupposing and said updating, using a size of the received data, and improves an accuracy of the assumed value, using a plural number of said data; and
    wherein in said selecting, one of the plural assumed levels is selected, using a frequency of occurrence of each assumed level of the multiple levels, and differences with respect to the data, to estimate the threshold value to demodulate the data.

16. The method according to claim 1, wherein said terminal has a threshold value detection unit including a counter for counting the received data and first to third counters for counting the data of first to third levels, divided by first and second threshold values, said method further comprising:
    (a) said threshold value detection unit initializing each of said counters;
    (b) said threshold value detection unit calculating, responsive to a value of a first input signal, a first threshold value in a case the first input signal is assumed to be of one of high and low levels and a second threshold value in a case the first input signal is assumed to be of another level;

(c) said threshold value detection unit deciding, as from a signal next to the first input signal, a relative magnitude of the input signal with respect to the first and second threshold values;
(d) said threshold value detection unit summing the input data to a corresponding level holding value of said first to third level data, divided by said first and second values, based on decided results, for averaging out a relevant level holding value;
(e) said threshold value detection unit updating the first and second threshold values, based on said level holding values of said first to third levels;
(f) said threshold value detection unit performing a control for carrying out a decision and averaging processing as from said deciding (c), if a value of the counter counting said data is smaller than a preset first value;
(g) said threshold value detection unit performing a control so that, if a value of said counter counting the data is not less than said first value, the counter counting said data is compared to a second value, so that, if the value of said counter counting the data is less than said second value, error values between the level holding values of said first to third levels, divided by said first and second threshold values, and said input data, are compared to a preset third value, and so that, if an error value is not smaller than the preset third value, the decision and averaging processing as from said deciding (c) will be carried out; and
(h) said threshold value detection unit performing control so that, if the error value is smaller than said third value, or the value of the counter counting the data is larger than said second value, the count value of said first counter is compared to the count value of said third counter, to output the threshold value with a larger count value.

17. The method according to claim 1, wherein said terminal includes a threshold value detection unit including a counter for counting the received data, said method comprising:
(a) said threshold value detection unit initializing said counter;
(b) said threshold value detection unit calculating, responsive to a value of a first input signal, a first threshold value and a second threshold value in a case the first input signal is assumed to be of one of high and low levels and in a case the first input signal is assumed to be of another level, respectively;
(c) said threshold value detection unit deciding, as from a signal next to the first input signal, relative magnitudes of the input signals with respect to the first and second threshold values;
(d) said threshold value detection unit adding input data to a corresponding level holding value of said first to third level data, divided by said first and second values, based on decided results, for averaging out said level holding value;
(e) said threshold value detection unit updating the first and second threshold values, based on said level holding values of said first to third levels;
(f) said threshold value detection unit performing control for carrying out the decision and averaging processing as from said deciding (c), if the value of the counter counting said data is smaller than a preset first value;
(g) said threshold value detection unit performing control so that, if a value of said counter counting the data is not less than said first value, the counter counting said data is compared to a second value and, if the value of said counter counting the data is less than said second value, error values between the level holding values of said first to third levels, divided by said first and second threshold values, and said input data, are compared to a preset third value, and so that, if the error value is not smaller than the preset third value, the decision and averaging processing as from said deciding (c) will be carried out; and
(h) said threshold value detection unit performing control for outputting the threshold value with a ratio of a high level to a low level of the level holding value of each level closer to a preset ratio, if the error value is smaller than said third value, or the value of the counter counting the data is larger than said second value.

18. The method according to claim 17, wherein said threshold value detection unit of said terminal includes first to third counters for counting data of said first to third levels, divided by said first and second threshold values;
said initializing including initializing each counter;
said summing including incrementing an associated counter based on results of a decision; and
said performing control including:
deciding whether or not the value of the ratio between the level holding value of said first level and the level holding value of said second level and the value of the ratio between the level holding value of said third level and the level holding value of said second level satisfy respective preset values, said deriving (h), in a case of said ratio values not satisfying the respective preset values, derives the level holding value of said second level by averaging from the level holding value of said first or third level and from the level holding value of said second level, and updating the threshold value;
selecting a threshold value with a larger count value; and
using a last calculated value in a case of an absence of a proper ratio.

19. The method according to claim 1, wherein said terminal includes a threshold value detection unit including a counter for counting the received data, said method comprising:
(a) said threshold value detection unit initializing said counter;
(b) said threshold value detection unit calculating and setting, responsive to a first input signal, each of first to m-th (where m is an integer not less than 1) threshold values, in a case the first input value is presumed to be of the (m+1)-th level, from the first to m-th threshold values, in a case the first input signal is presumed to be of the first level, m being a preset integer not less than 1;
said method also including, for each of the cases where the first input signal is assumed to be from the first level to the (m+1)-th level,
(c) said threshold value detecting unit deciding, as from a signal next to the initial signal, the relative magnitude of the input data with respect to the first to mth threshold values of the input data;
(d) said threshold value detecting unit updating, based on decided results, an associated level holding values of the first level to the (m+1)-th level data, divided by said first to m-th threshold values, using the input data;
(e) said threshold value detecting unit updating the threshold value, based on data of said first to (m+1)-th levels;
(f) said threshold value detecting unit performing control for carrying out a processing of a decision and an updating as from said deciding (c) in a case a value of the counter counting said data is smaller than a preset value; and
(g) said threshold value detecting unit performing control so that, in a case the value of the counter counting said data is not smaller than a preset value, an error of a ratio as to the level holding values from a preset ratio is calculated for each of the first to m-th threshold levels, and each threshold value corresponding to a smaller error value is output.

20. The method according to claim 19, wherein, when said threshold value detecting unit updates an associated level holding value of the first to (m+1)-th level data, divided by said first to m-th threshold values, using said input data, a difference between the original level holding value and the input data multiplied by a preset coefficient is summed to the original level holding value.

21. The method according to claim 1, wherein said terminal includes a threshold value detection unit at least having a counter for counting received data, said method further comprising:
   (a) said threshold value detection unit initializing said counter; and
   (b) said threshold value detection unit calculating and setting, responsive to a value of the first input signal, each of first to m-th threshold values in a case said first input signal is assumed to be of the (m+1)-th level, m being a preset integer not less than 1, from the first to m-th threshold values in a case said first input signal is assumed to be of the first level;
   said method also comprising, for each of the cases where the first input signal is assumed to be of the first to (m+1)-th levels,
   (c) said threshold value detection unit deciding, as from a signal next to the first signal, relative magnitudes of the input data with respect to the first to m-th threshold values;
   (d) said threshold value detection unit averaging, based on decided results, an associated level holding values of said first to (m+1)-th level data, divided by said first to m-th threshold values, using the input data, and storing said input data in a storage unit;
   (e) said threshold value detection unit updating the value of said threshold value, based on the hold values of said first to (m+1)-th levels;
   (f) said threshold value detection unit performing control for carrying out a processing of decision and updating will be carried out as from a signal next to the deciding (c), in a case the value of the counter counting the data is smaller than a preset value;
   (g) said threshold value detection unit calculating, in a case a value of the counter counting said data is not less than said preset value, a total sum of a sum of errors of the data stored in said storage unit and the level holding values for the respective cases where said first input signal is assumed to be of the first level to the (m+1)-th levels (referred to as 'first to (m+1)-th errors'); and
   (h) comparing relative magnitudes of first to (m+1)-th differences and selecting and outputting a threshold value with a smaller difference.

22. The method according to claim 19, wherein, in said deciding the relative magnitudes with respect to said first to m-th threshold values, the associated error is set to a predetermined value.

23. The method according to claim 1, wherein said terminal includes a threshold value detection unit, said method comprising:
   (a) said threshold value detection unit calculating and setting, responsive to a first input signal, each of first to m-th threshold values, in a case the first input value is presumed to be of the (m+1)-th level, from the first to m-th threshold value, in a case the first input signal is presumed to be of the first level;
   said method also including, for each of cases where the first input signal is assumed to be from the first level to the (m+1)-th levels,
   (b) deciding, as from a signal next to the first signal, relative magnitudes of the input data with respect to the first to the m-th threshold value;
   (c) summing the input data to an associated value of the first to (m+1)-th data, divided by said first to m-th threshold values, based on decided results, by way of averaging, and calculating an error;
   (d) said threshold value detection unit re-calculating said threshold values, based on the data of said first level to the (m+1)-th level;
   (e) further carrying out a sequence of decision and averaging operations in a case the error value is larger than a predetermined first value;
   (f) calculating, in a case the error value is smaller than said first value, a sum or an average value of latest differences of the input data with respect to assumed differences of the first to (m+1)-th levels; and
   (g) said threshold value detection unit deciding a minimum value among error values as results of respective assumptions, to decide which assumption has been correct, to output the value of the respective threshold values.

24. A terminal apparatus performing wireless communication with a wireless station in accordance with a multi-level QAM (quadrature amplitude modulation), said terminal apparatus comprising:
   an amplitude synchronization detection unit for estimating a threshold value for deciding data along an amplitude; and
   an amplitude demodulating unit for effecting amplitude demodulation using said threshold value,
   said amplitude synchronization detection unit including:
      a setup unit presupposing which of a level a received data signal may belong to and for setting up a plural number of threshold values that may be assumed in association with a presupposition (referred to as assumed threshold values);
      an update unit sequentially updating said assumed threshold values based on the received data signal; and
      a selection unit selecting an ultimate threshold value from the plural assumed threshold values, wherein said selection unit calculates a difference between ratios between low level data and high level data divided by said plural assumed threshold values and a preset ratio and selects a threshold value with a smaller difference.

25. The terminal apparatus according to claim 24, wherein said selection unit selects one of said plural assumed threshold values based on a number of times of occurrence of the data in said levels divided by said assumed threshold values.

26. The terminal apparatus according to claim 24, wherein, if, when said selection unit calculates a difference between ratios between low level data and high level data divided by said plural assumed threshold values and a preset ratio and selects a threshold value with a smaller difference, said difference is larger than a preset value, the selection unit determines that a proper value is lacking and uses a previous threshold value.

27. The terminal apparatus according to claim 24, wherein said selection unit selects a threshold value with a smaller difference from each received data of ultimately calculated average data of plural data.

28. The terminal apparatus according to claim 24, wherein, when said selection unit selects a threshold value with a smaller difference from each received data of ultimately calculated average data of plural data, said difference is larger than a predetermined value, said selection unit determines that a proper value is lacking and uses a previous threshold value.

29. The terminal apparatus according to claim 24, wherein said update unit presupposes data positions for a totality of the assumed threshold values, from one received data to another, to calculate the totality of the assumed threshold values.

30. The terminal apparatus according to claim 24, wherein said update unit detects to which level the received data belongs and wherein there are cases where plural assumed threshold values are not updated each time.

31. The terminal apparatus according to claim 24, further comprising
a transformation unit executing transformation of the phase-synchronized multi-level QAM data into a first quadrant of a coordinate system of I and Q axes, wherein the threshold values are calculated on a basis of the transformed data.

32. The terminal apparatus according to claim 31, wherein said transformation unit moves the multi-level QAM data to the first quadrant of the I and Q axes by taking absolute values of or rotating the multi-level QAM data.

33. The terminal apparatus according to claim 24, further comprising
a unit for normalizing the received data using a fading vector, wherein
threshold value estimation is carried out on the basis of the normalized data, and wherein
a threshold value for amplitude demodulation is accorded as a coefficient for the fading vector for following up with a fading.

34. The terminal apparatus according to claim 24, further comprising
a unit for calculating the threshold value from received data and for re-calculating the threshold value with a relatively short period to follow a fading.

35. The terminal apparatus according to claim 24, wherein the updating of the assumed threshold value is terminated when a number of data used for calculating the threshold value has exceeded a predetermined number and wherein said selection unit selects one of the plural assumed threshold values.

36. The terminal apparatus according to claim 24, wherein the updating of the assumed threshold value is terminated when a number of data used for calculating the threshold value has exceeded a predetermined number and when an error value between a value of the level of the multiple levels corresponding to the assumed threshold value and the data meets a preset condition,
said selection unit then selecting one of the plural assumed threshold values.

37. The terminal apparatus according to claim 24, wherein said selection unit decides which assumption is correct, based on a frequency of occurrence of data in levels associated with said assumed threshold values and/or on a difference of received data with respect to the assumed levels to determine the threshold value.

38. The terminal apparatus according to claim 24, wherein said amplitude synchronization detection unit includes a threshold value detection unit comprising:
a counter for counting a number of received data; and
first to third counters for counting data of first to third levels divided by said first and second threshold values,
said threshold value detection unit further including:
a first unit for initializing each of said counters;
a second unit for calculating, responsive to a value of the first input signal, a first threshold value in a case the first input signal is assumed to be one of high and low levels and a second threshold value in a case the first input signal is assumed to be another level;
a third unit for deciding, after an initial signal, relative magnitudes of the input data with respect to the first and second threshold values;
a fourth unit for summing, based on decided results, the input data to an associated level holding value of the first to third level data, divided by said first and second threshold values and for averaging;
a fifth unit for updating values of said first and second threshold values, based on hold values of said first to third levels;
a sixth unit for performing a control for carrying out a decision and an averaging of said third and fourth units in a case a value of the counter counting said data is smaller than a preset first value;
a seventh unit for performing a control so that, in a case a value of the counter counting said data is not less than said first value, the count value of the counter counting the data is compared to a second value and so that, in a case the value of said counter counting the data is smaller than said second value, a difference between the hold values of said first to third levels, divided by said first and second threshold values, and said input data, is compared to a preset third value, said seventh unit also performing a control for carrying out a decision and an averaging of said third and fourth units in a case said difference is not less than said third value; and
an eighth unit for performing a control so that, when said error value is smaller than said third value or the value of said counter counting said data is larger than said second value, the count values of said first to third counters are compared to each other and the threshold value with the larger count value is output,
said amplitude demodulating unit executing amplitude demodulation using the threshold value output from said threshold value detection unit.

39. The terminal apparatus according to claim 24, wherein said amplitude synchronization detection unit includes a threshold value detection unit having a counter for counting the received data,
said threshold value detection unit further including:
a first unit for initializing said counter;
a second unit for calculating, responsive to a value of a first input signal, a first threshold value in a case said first input signal is assumed to be one of first and second levels, and a second threshold value in a case said first input signal is assumed to be the other level;
a third unit for deciding, as from a signal next to the first signal, relative magnitudes of the input data with respect to the first and second threshold values;
a fourth unit for summing input data to a corresponding level holding value of the first to third level data, divided by said first and second threshold values, by way of averaging;

a fifth unit for updating the values of said first and second threshold values, based on hold values of said first to third levels;

a sixth unit for performing a control for carrying out a decision and an averaging of said third and fourth units in a case a value of the counter counting said data is smaller than a preset first value;

a seventh unit for performing a control so that, in a case the value of the counter counting said data is not less than said first value, the count value of the counter counting the data is compared to a second value, and so that, in a case the value of said counter counting the data is smaller than said second value, an error value between the level holding values of said first to third levels, divided by said first and second threshold values, and said input data, is compared to a preset third value, said seventh unit also performing a control for carrying out a decision and an averaging of said third to fifth units in a case said difference is not less than said third value; and an eighth unit for performing a control so that, in a case said error value is smaller than said third value or the value of said counter counting said data is larger than said second value, the threshold value with a ratio of high to low levels of level holding values of said respective levels closer to a preset ratio is output, said amplitude demodulating unit executing amplitude demodulation using the threshold value output from said threshold value detection unit.

40. The terminal apparatus according to claim 38, wherein in said threshold value detection unit, said fourth unit includes control means for incrementing an associated counter based on the decided results, said eighth unit including deciding means for deciding whether or not a value of a ratio between a hold value of said first level and a hold value of said second level assumes a preset value and also for deciding whether or not a value of a ratio between a hold value of said third level and a hold value of said second level assumes a preset value, said deciding means, in a case the values of said ratios do not assume the preset values, deriving the hold value of said second level as an average value from the hold values of the first or third level and from the hold value of said second level to update the threshold value, wherein said threshold value detection unit includes:

means for selecting the threshold value with a larger count value; and means for using the previously calculated threshold value in a case a proper ratio is lacking.

41. The terminal apparatus according to claim 24, wherein said amplitude synchronization detection unit includes a threshold value detection unit having a counter for counting the received data, said threshold value detection unit further including:

a first unit for initializing said counter;

a second unit for calculating and setting, responsive to a first input signal, respective threshold values from first to m-th (where m is an integer not less than 1) threshold values in a case the first input signal is assumed to be of the first level to first to m-th threshold values in a case the first input signal is assumed to be of the (m+1)-th level;

said threshold value detection unit also including, for each of the cases where said first input signals are assumed to be of the first to (m+1)-th level, a third unit for deciding, as from a signal next to the first signal, relative magnitudes of the input data with respect to the first to m-th threshold values;

a fourth unit for performing control, based on decided results, for updating an associated level holding value of first to (m+1)-th level data, divided by said first to m-th threshold values, using the input data;

a fifth unit for updating the threshold value based on data of said first to (m+1)-th levels;

a fifth unit for performing a control for carrying out a decision and an updating of said third and fourth units in a case a value of the counter counting said data is smaller than a preset value; and a sixth unit for calculating, in a case the value of said counter counting said data is not less than said preset value, an error of a ratio as to the level holding values from a preset ratio for each of the first to m-th threshold levels, and for selecting and outputting the respective threshold values corresponding to a smaller error, said amplitude demodulating unit executing amplitude demodulation using the threshold values output from said threshold value detection unit.

42. The terminal apparatus according to claim 41, wherein, when the fourth unit of said threshold value detecting unit updates an associated level holding value of the first to (m+1)-th level data, divided by said first to m-th threshold values, using the input data, the difference between the original level holding values and input data multiplied by a preset coefficient is summed to the original level holding values.

43. The terminal apparatus according to claim 24, wherein said amplitude synchronization detection unit includes a threshold value detection unit having a counter for counting received data, said threshold value detecting unit further including:

a first unit for initializing said counter;

a second unit for calculating and setting, responsive to the value of the first input signal, respective threshold values from the first to m-th (where m is an integer not less than 1) threshold values, m being an integer not less than 1, in a case the first input signal is assumed to be of the first level, to the first to m-th threshold values in a case the first input signal is assumed to be of the (m+1)-th level, said threshold value detection unit including, for each of the cases where said first input signal is assumed to be of the first to (m+1)-th level;

a third unit for deciding, as from a signal next to the first signal, relative magnitudes of the input data with respect to the first to m-th threshold values;

a fourth unit for averaging, based on decided results, the associated level holding value of the first to (m+1)-th level data, divided by said first to m-th threshold values, using input data, for averaging the associated level holding value and for storing the input data in a storage unit;

a fifth unit for updating the values of said threshold values based on hold values of said first to (m+1)-th level;

a sixth unit for performing control for carrying out a processing of a decision and an updating of said third and fourth units when the value of said counter counting said data is smaller than a preset value;

a seventh unit for calculation, in a case the value of the counter counting said data is not less than said preset value, a total sum of a sum of errors of the data stored in said storage unit and the level holding values for the respective cases where said first input signal is assumed to be of the first level to the (m+1)-th levels (referred to as 'first to (m+1)-th errors'); and an eighth unit for comparing relative magnitudes of the first to (m+1)-th differences and for selecting and outputting a threshold value with a smaller difference, said amplitude demodulating unit executing amplitude demodulation using the threshold value output from said threshold value detection unit.

44. The terminal apparatus according to claim 41, wherein, in deciding the relative magnitudes with respect to said first and second threshold values, the associated error is set to a preset value.

45. The terminal apparatus according to claim 24, wherein said amplitude synchronization detection unit includes a threshold value detection unit;

said threshold value detection unit includes a unit for calculating and setting, responsive to a value of the first input signal, respective threshold values from the first to m-th (where m is an integer not less than 1) threshold values, in a case the first input signal is assumed to be of the first level, to the first to m-th threshold values in a case the first input signal is assumed to be of the (m+1)-th level;

said threshold value detection unit also including, for each of the cases where the first input signal is assumed to be of from the first level to the (m+1)-th level, a unit for performing a control to execute:

a first processing for deciding, as from a signal next to the first signal, the relative magnitudes of the input data with respect to the first to m-th threshold values;

a second processing for summing the input data to an associated level holding value of from the first to the (m+1)-th level data, divided by said first to m-th threshold values, based on the decided results, by way of averaging, and for obtaining respective error values;

a third processing for re-calculating the values of said threshold values, based on said data of from the first level to the (m+1)-th level;

a fourth processing for carrying out the decision and averaging of said first processing, second processing and said third processing in case the error values are larger than a predetermined first value; and a fifth processing for calculating a sum or an average value of latest error values of said input data with respect to assumed data of from the first level to the (m+1)-th level, in case said error values are smaller than said first value; and a unit for deciding a minimum value among error values as results of respective assumptions, to decide which assumption has been correct, to output the value of the respective threshold values, said amplitude demodulating unit executing amplitude demodulation using the threshold value output from said threshold value detection unit.

46. The terminal apparatus according to claim 24, comprising:

a demodulating unit including a phase synchronization unit;

a fading vector estimating unit; and an amplitude modulating unit, said amplitude synchronization detection unit including:
a first-quadrant transformation unit; and
a threshold value detection unit, said fading vector estimating unit receiving a CPICH (common pilot channel) spread/demodulated signal to output a fading vector with a reduced noise ratio;

said phase synchronization unit receiving a HS-PDSCH (physical downlink common channel) spread/demodulated signal and multiplying the HS-PDSCH spread/demodulated signal with a complex conjugate of the fading vector, inclusive of information on the transmission line, to generate HS-PDSCH I and HS-PDSCH Q signals freed of a phase offset which is an effect of the transmission line, to send said I and Q signals to said amplitude synchronization detection unit and to said amplitude demodulating unit;

said first-quadrant transformation unit including a unit for outputting a first quadrant signal obtained on transforming second, third and fourth quadrant signals of the phase-synchronized HS-PDSCH I and HS-PDSCH Q signals to the first quadrant;

said threshold value detection unit including a unit for calculating threshold values for the multi-level QAM from said first quadrant signal or from said first quadrant signal and the fading vector to send the threshold value signal to said amplitude demodulating unit; and said amplitude demodulating unit deciding the relative signal amplitudes of said threshold signals and said signals from said HS-PDSCH I and HS-PDSCH Q signals and said threshold signals to output multi-level QAM demodulated signals.

47. The terminal apparatus according to claim 46, wherein said threshold value detection unit includes means for assuming a plurality of possibilities in advance, as to which level received data belongs, with a use of a magnitude of the received signal, for improving a precision of the assumed values with a use of a plurality of said data, and for estimating the threshold values, from the assumed plural values, with a use of a frequency or an error from the data.

48. The terminal apparatus according to claim 47, wherein said threshold value detection unit multiplies the fading vector signal with the threshold value as found to output the resulting product as said threshold value signal.

49. A communication system comprising the terminal apparatus as set forth in claim 24 and a base station communicating with said mobile station in accordance with the multi-level QAM system.

* * * * *